US009456360B2

(12) United States Patent
Lagen Morancho et al.

(10) Patent No.: US 9,456,360 B2
(45) Date of Patent: Sep. 27, 2016

(54) METHOD AND SYSTEMS FOR DECENTRALIZED INTERFERENCE MANAGEMENT IN A MULTI-ANTENNA WIRELESS COMMUNICATION SYSTEM

(71) Applicant: UNIVERSITAT POLITECNICA DE CATALUNYA, Barcelona (ES)

(72) Inventors: Sandra Lagen Morancho, Barcelona (ES); Adrian Agustin De Dios, Huesca (ES); Josep Vidal Manzano, Barcelona (ES)

(73) Assignee: Universitat Politecnica de Catalunya, Barcelona (ES)

( * ) Notice: Subject to any disclaimer, the term of this patent is extended or adjusted under 35 U.S.C. 154(b) by 101 days.

(21) Appl. No.: 14/452,968

(22) Filed: Aug. 6, 2014

(65) Prior Publication Data
US 2015/0078186 A1   Mar. 19, 2015

Related U.S. Application Data

(60) Provisional application No. 61/862,566, filed on Aug. 6, 2013.

(51) Int. Cl.
*G06F 11/00*   (2006.01)
*H04J 1/16*   (2006.01)
(Continued)

(52) U.S. Cl.
CPC ............ *H04W 24/02* (2013.01); *H04B 7/024* (2013.01); *H04B 7/04* (2013.01); *H04B 7/0404* (2013.01);
(Continued)

(58) Field of Classification Search
CPC .. H04B 7/024; H04B 7/0404; H04B 7/0413; H04B 7/0426; H04B 7/0456; H04B 7/0617; H04B 7/04; H04B 7/0619; H04W 52/04; H04W 24/02; H04L 5/1438
USPC ................ 370/252, 329, 330, 352, 253, 254
See application file for complete search history.

(56) References Cited

U.S. PATENT DOCUMENTS 6,718,184 B1   4/2004   Aiken et al.
8,023,855 B2   9/2011   Hattori et al.
(Continued)

FOREIGN PATENT DOCUMENTS

EP        2 045 930 A1   4/2009
WO   WO 2010/148371 A2   12/2010
(Continued)

OTHER PUBLICATIONS

Huawei, Hisilicon, "3GPP R1-130856, Evaluation assumptions for small cell enhancements-physical layer," 3GPP TSG RAN WG1 Meeting #72, St. Julian's, Malta, Jan. 28-Feb. 1, 2013.
(Continued)

*Primary Examiner* — Chuong T Ho
(74) *Attorney, Agent, or Firm* — RatnerPrestia

(57) ABSTRACT

A method that includes interference control at transmitters and interference mitigation at receivers in a wireless communication system is disclosed. Embodiments of the present invention exploit the interference sensitivity at neighboring terminals by taking into account the reciprocity of propagation radio channels in Time Division Duplexing systems (TDD). It can be applied to design the resource allocation for downlink (DL) and uplink (UL) transmissions in a wireless communication system. The methods include the self-configuration of the transmit power, the transmit precoder and the receive filter, at each transmitter and receiver in a multi-cell network. Systems are also provided and configured for implementing the methods of the invention.

19 Claims, 17 Drawing Sheets

Intended DL signals

Interfering DL signals

(51) Int. Cl.
| | |
|---|---|
| H04L 1/00 | (2006.01) |
| H04L 12/26 | (2006.01) |
| H04W 24/02 | (2009.01) |
| H04B 7/04 | (2006.01) |
| H04B 7/02 | (2006.01) |
| H04B 7/06 | (2006.01) |
| H04W 52/04 | (2009.01) |
| H04W 52/14 | (2009.01) |
| H04W 52/24 | (2009.01) |
| H04L 5/00 | (2006.01) |
| H04L 5/14 | (2006.01) |

(52) U.S. Cl.
CPC .......... *H04B 7/0413* (2013.01); *H04B 7/0426* (2013.01); *H04B 7/0456* (2013.01); *H04B 7/0617* (2013.01); *H04B 7/0619* (2013.01); *H04W 52/04* (2013.01); *H04L 5/0033* (2013.01); *H04L 5/0073* (2013.01); *H04L 5/1469* (2013.01); *H04W 52/143* (2013.01); *H04W 52/243* (2013.01)

(56) References Cited

U.S. PATENT DOCUMENTS

| | | | |
|---|---|---|---|
| 8,023,955 | B2 | 9/2011 | Anderson |
| 8,260,206 | B2 | 9/2012 | Damnjanovic |
| 8,401,480 | B2 | 3/2013 | Koo et al. |
| 8,711,688 | B1* | 4/2014 | Smith ............ H04K 1/02 370/229 |
| 8,774,066 | B2* | 7/2014 | Ghauri ............ H04W 16/14 370/280 |
| 2010/0238832 | A1* | 9/2010 | Gunnarsson ........ H04W 52/243 370/252 |
| 2011/0116490 | A1* | 5/2011 | Wilhelmsson ........ H04W 16/14 370/343 |
| 2012/0307749 | A1* | 12/2012 | Banister ............ H04B 1/0475 370/329 |

FOREIGN PATENT DOCUMENTS

| | | |
|---|---|---|
| WO | WO 2011/055943 A2 | 5/2011 |
| WO | WO 2011/088465 A1 | 7/2011 |

OTHER PUBLICATIONS

3GPP Technical Report 36.829, "Enhanced performance requirement for LTE User Equipment (UE)," v11.1.0 Release Jan. 11, 2013.

Christensen et al., "Weighted Sum-Rate Maximization using Weighted MMSE for MIMO-BC Beamforming Design," IEEE Trans. on Wireless Communications, vol. 7, No. 12, Dec. 2008, pp. 4792-4799.

Shi et al., "An Iteratively Weighted MMSE Approach to Distributed Sum-Utility Maximization for a MIMO Interfering Broadcast Channel," IEEE Trans. on Signal Processing, vol. 59, No. 9, Sep. 2011, pp. 4331-4340.

Kelly et al., "Rate control for communication networks: shadow prices, proportional fairness and stability," Journal of the Operational Research Society, vol. 49, Apr. 1998.

\* cited by examiner

SIMULATION ASSUMPTIONS

| Parameter | Setting |
|---|---|
| Deployment scenario | SCE Scenario #2a |
| Network Layout | 500m macro-layer inter-site distance |
| Cell layout | 7 macro-sites with 3 sectors per site (21 macrocells) |
| Bandwidth | 10MHz |
| Carrier frequency | Macro-eNB: 2GHz; Small-eNB: 3.5GHz |
| Traffic model | Full load: 60 users per macrocell geographical area |
| UE placement | 2/3 UEs inside the cluster; the remaining UEs are uniformly distributed within the macrocell area; 80% users indoor; 20% users outdoor |
| Transmit power | Macro-eNB: 46dBm; Small-eNB: 30dBm |
| Antenna system | DL 2x1 |
| Antenna gain | Macro-eNB: 17 dBi; Small-eNB: 5 dBi; UE: 0 dBi |
| Antenna pattern | Macro-eNB: 3D; Small-eNB and UE: Omni |
| Antenna Height | Macro-eNB: 25m; Small-eNB: 10m; UE: 1.5m |
| Path loss | Macro-eNB to UE: ITU UMa; Small-eNB to UE: ITU UMi |
| Penetration losses | For outdoor UEs: 0dB; For indoor UEs: 20dB+0.5$d_{in}$ ($d_{in}$: independent uniform random value between [ 0, min(25,$d$) ] for each link, being $d$ the distance between eNB and UE) |
| Shadow fading | Macro-eNB to UE: ITU UMa; Small-eNB to UE: ITU UMi |
| Fast fading channel | Pedestrian model |
| Cell selection criteria | RSRQ for inter-frequency selection with fixed CRE and RSRP for intra-frequency selection |
| Number of clusters per macro | 1 |
| Number of small cells per cluster | 4, 10 |
| Cell Range Extension (CRE) | Fixed |
| Radius for small cell dropping in a cluster | 50m |
| Radius for UE dropping in a cluster | 70m |
| Minimum distance (2D distance) | Small-eNB to Small-eNB: 20m; Small-eNB to UE: 5m; Macro-eNB to small cell cluster center: 105m; Macro-eNB to UE: 35m; Cluster center to cluster center: 2 x Radius for small cell dropping in a cluster = 100m |
| Network synchronization | Synchronized |
| UE noise figure | 9dB |
| UE speed | 3km/h |
| UE receive filter | MMSE-IRC |
| CRS interference modelling | Included |

Figure 9

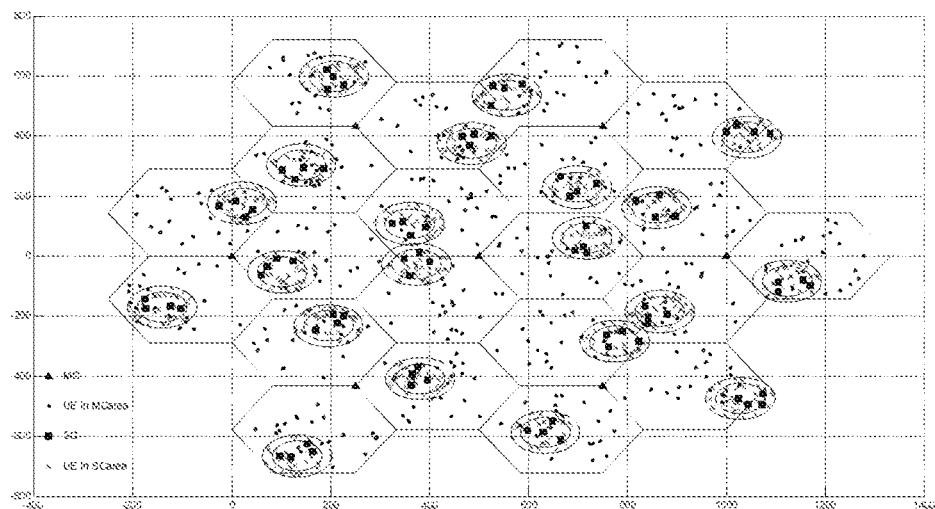
a) 1 cluster – 4 small cells per cluster
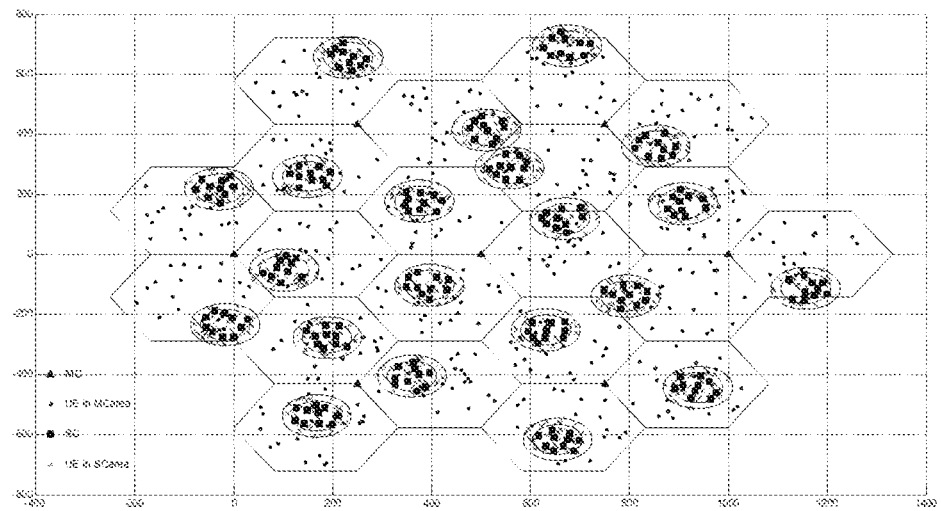
b) 1 cluster – 10 small cells per cluster
Figure 10

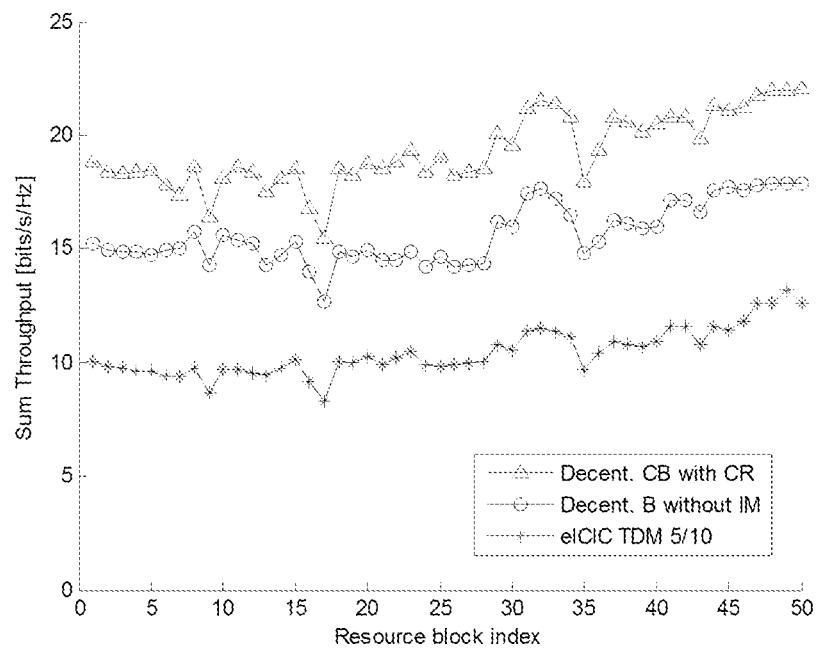
a) 1 cluster – 4 small cells per cluster
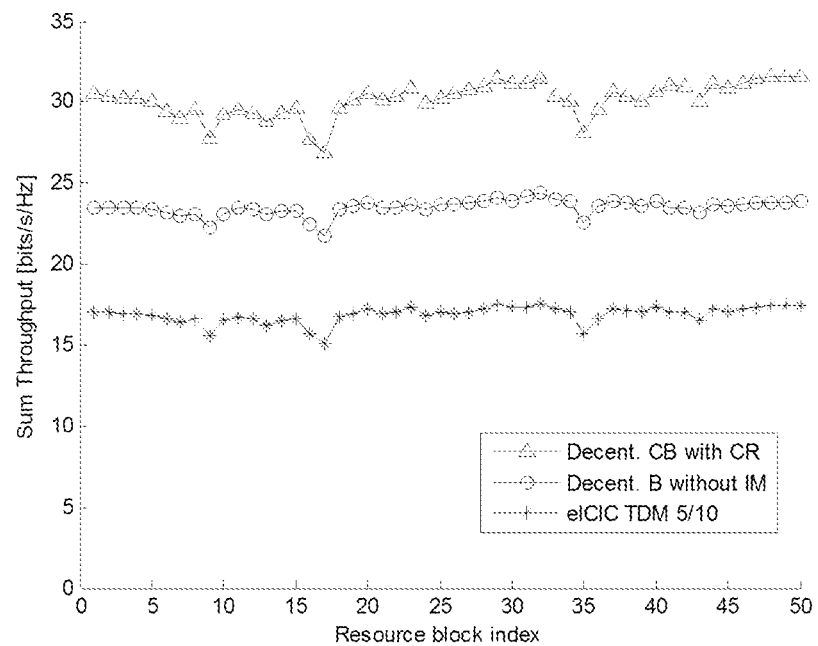
b) 1 cluster – 10 small cells per cluster
Figure 11

METHODS FOR UPLINK SOUNDING

| | Method A | Method B | Method C | Method D |
|---|---|---|---|---|
| Assumptions | | | | |
| - User Scheduling | For each eNB, a single user is scheduled to each RB ||||
| - Subband length (minimum number of continuous RBs assigned per user) | 4 RBs | 4 RBs | 4 RBs | 1 RB |
| - Number of subbands | $S=B/4=4$ | $S=4$ | $S=B/4=4$ | $S=B=16$ |
| - Maximum number of subbands allocated per user | 1 | $S$ | $S$ | $S$ |
| SRS configuration | | | | |
| - SRS periodicity | 20 ms | 5 ms | 20 ms | 20 ms |
| - Mode | Frequency-hopping ||||
| - Hopping scheduling | 20 ms | 20 ms/subband | 20 ms | 20 ms |
| Requirements | | | | |
| - Multiple OFDM symbols of UpPTS in the SYNC subframe are needed if the user has multiple receive antennas | Yes | Yes | Yes | No |
| - Component subband specific UL power control is available | No | No | Yes | Yes |
| - Precoded and non-antenna specific SRS are available with a minimum SRS length equivalent to 1 RB | No | No | No | Yes |
| Implications | | | | |
| - SRS granularity | 1 subband | 1 subband | 1 subband | 1 RB |
| - Maximum number of RBs that the user can be scheduled to | $B/S=4$ | $B=16$ | $B=16$ | $B=16$ |

Figure 12

LIST OF ABBREVIATIONS AND SYMBOLS

| Abbreviation | Name |
| --- | --- |
| 3GPP | 3$^{rd}$ Generation Partnership Project |
| BS(s) | Base Station(s) |
| CSI | Channel State Information |
| DL | Downlink |
| FDD | Frequency Division Duplex |
| LTE-A | Long Term Evolution - Advanced |
| MIMO | Multiple-input multiple-output |
| MMSE | Minimum Mean Square Error |
| MSE | Mean Square Error |
| UE(s) | User Equipment(s) |
| UL | Uplink |
| TDD | Time Division Duplex |

| Symbol | Name |
| --- | --- |
| $\mathbf{H}_{i,i}$ | Channel matrix |
| $\mathbf{T}_i$ | DL transmit filter matrix |
| $\mathbf{R}_i$ | DL receive filter matrix |
| $\mathbf{N}_i$ | Covariance matrix of the received interference-plus-noise |
| $r_i$ | Data rate |
| $\mu_i$ | User priority coefficient |
| $P_i^{max}$ | Available (maximum) power |
| $r_i^{max}$ | Maximum data rate |
| $\mathbf{E}_i$ | MSE-matrix |
| $\mathbf{W}_i$ | Error weighting matrix |
| $\mathbf{\Upsilon}_i$ | Interference cost matrix |
| $\hat{\mathbf{\Upsilon}}_i$ | Estimate of the interference cost matrix |
| $\bar{\mathbf{T}}_i$ | UL transmit filter matrix |
| Tr() | Trace operator |
| det() | Determinant operator |
| log$_2$() | Base-2 logarithm |

Figure 16

METHOD AND SYSTEMS FOR DECENTRALIZED INTERFERENCE MANAGEMENT IN A MULTI-ANTENNA WIRELESS COMMUNICATION SYSTEM

CROSS REFERENCE TO RELATED APPLICATIONS

This application claims priority to U.S. Provisional Patent Application No. 61/862,566, filed Aug. 6, 2013, the contents of such application being incorporated by reference herein.

FIELD OF THE INVENTION

This invention relates to the field of wireless communications. More specifically, the invention relates to methods and systems for decentralized managing of interference in multi-antenna systems, that includes transmitter design for controlling the generated interference and receiver design for mitigating the interference, through the self-configuration of the transmit power, the transmit precoding, and the receive filter, in a multi-cell network based on Time Division Duplexing (TDD). The proposed methods rely on propagation channel reciprocity for decentralized interference management. The invention is applicable to, but not limited to, a communication resource access, particularly for an enhanced downlink or uplink packet-based data transmission employing Orthogonal Frequency Division Multiple Access (OFDMA)-based system used in the 3rd Generation Partnership Project (3GPP) Long Term Evolution Advanced (LTE-Advanced) standard.

BACKGROUND OF THE INVENTION

With the objective of improving the system efficiency and providing a homogenous coverage, the wireless communication networks envision the deployment of multiple-input multiple-output (MIMO) systems, full frequency reuse, and a denser deployment of transmitters. In such scenario, efficient interference management techniques are expected to play a crucial role in improving the transmission data rates.

The MIMO interfering channel is a generic model for cellular communication systems, in which a plurality of transmitters, each equipped with multiple antennas, wish to send independent messages to their intended receiver while generating interference to all remaining receivers. Unfortunately, the optimal transmit/receive strategy with linear spatial filters that maximize the weighted sum of data rates of the system is not known because of the non-convexity of the problem.

Already existing centralized interference management approaches allow finding locally optimal solutions, but they require of a central unit to collect the Channel State Information (CSI) of all receivers, and further the complexity of the solution scales with the number of transmitters times number of receivers. For those reasons, most current research focuses on decentralized techniques. Recent decentralized procedures consider the exchange of control-plane messages among transmitters to convey the degradation of the data rate due to the created interference (also called interference prices). This knowledge allows to control the interference at the transmitters by selecting the transmit power and the linear transmit precoder. On the other hand, the maximization of the weighted sum of data rates can be obtained by iteratively minimizing the weighted sum of Mean Square Errors (MSEs) [Christensen-08][Shi-11], where the error weighting matrices are chosen accordingly to the inherent relation between the data rate and the Minimum MSE (MMSE).

Nevertheless, all these decentralized procedures require the interfering channels be estimated and reported by the receivers to interfering transmitters. Hence, channel estimation errors on the interfering links and the overhead associated to the reporting of channel gains have a detrimental effect on the overall potential gains.

Other solutions proposed in the field are detailed in the patent documents below. They are mainly focused on wireless cellular communication systems, where transmitters are Base Stations (BSs) and receivers are User Equipments (UEs). The downlink (DL) transmission is understood as the transmission from BSs to UEs, and the uplink (UL) transmission as the transmission from UEs to BSs.

U.S. Pat. No. 6,718,184, incorporated by reference herein, describes a linear precoding technique for an antenna array at the BS that is able to balance the coverage and the generated interference towards other cells by studying the quotient between the DL received power at the desired in-cell UE and the DL power at the other-cells UE. To that end, they estimate the covariance matrix of the desired signal and the covariance matrix of the interfered UEs using UL transmissions. The procedure is not able to guarantee a certain SINR or link quality to the UEs.

EP-A-2045930, incorporated by reference herein, discloses a method for decentralized yet iterative power control in a network of nodes with the target of guaranteeing a certain CA. Convergence of the method is proved. The method exploits Time Division Duplex (TDD) access mode and hence channel reciprocity, but it is not applicable to a multi-antenna transmission system.

U.S. Pat. No. 8,023,955, incorporated by reference herein, enables decentralized schedulers by exploiting the reciprocity of radio channels in TDD or Frequency Division Duplex (FDD) systems by preemptively controlling inter-cell interference levels in the downlink transmission. It applies for the interference control in the UL transmission.

WO-A-2010/148371, incorporated by reference herein, provides inter-cell interference coordination in femtocell networks where the UE determines the information from interfering cells and reports this information to them either directly or indirectly through a backhaul link. The information reported by the UE is used for beamforming design so as to mitigate the interference in the direction of said UE. Communication among cells is required.

EP-A-2045930, incorporated by reference herein, describes methods for inter-cell interference coordination using resource partitioning in which UEs are allocated to orthogonal time or frequency resources. WO-A-2010/148371 discloses methods and apparatus for beamforming for femtocells, such as in LTE wireless networks, to provide inter-cell coordination and interference mitigation based on a macrocell UE obtaining information regarding an interfering Home evolved Node B (HeNB) and the HeNB may adjust an output based on the information.

U.S. Pat. No. 8,023,855 divulges a computer program for performing a method of inter-cell control by allocating uplink transmission resources in a mobile station of a wireless communication system where a figure of merit for transmission to the BS is calculated for adjusting an uplink transmission resource parameter at the UE.

WO-A-2011/088465, incorporated by reference herein, reveals a method for interference mitigation in a wireless communication system where interference information including an amount of uplink interference experienced at a BS or serving cell is determined (comparing the interference value to a target value) and scheduling signal transmission is performed within the serving cell based at least in part upon the interference information.

EP-B-2045930, incorporated by reference herein, discloses a method for communicating between a transceiver apparatus and a communication partner in repetitive radio frames wherein the step of transmitting during the transmission time slot of the second radio frame comprises transmitting the second transmit signal with the second transmission power being dependent on the interference power and a control component.

U.S. Pat. No. 8,401,480, incorporated by reference herein, refers to a method for transmitting feedback information at a UE in a wireless communication system that performs a Coordinated Multi-Point (CoMP) operation, comprising measuring noise and interference variances corresponding to a signal strength or an interference level using reference signals received from one or more neighbor BSs.

U.S. Pat. No. 8,260,206, incorporated by reference herein, reveals a method for uplink and downlink inter-cell interference coordination (ICIC) by a HeNB where a data exchange with a UE is performed, a measurement report is received and transmit power is reduced with a first slew rate and increased with a second slew rate.

WO-A-2011/055943, incorporated by reference herein, discloses a method for UL transmission control in a wireless communication system including the steps of receiving from a first UE information on a frequency band having an UL interference occurring therein with respect to a second BS and allocating an UL resource for the first UE based upon the frequency band.

SUMMARY OF THE INVENTION

This disclosure generally relates to a method and systems for a decentralized managing of interference in a wireless communication system, including interference control at transmitters and interference mitigation at receivers, which takes into account the reciprocity of propagation radio channels in Time Division Duplexing systems (TDD). In a possible embodiment that optimizes the DL performance metrics of a wireless cellular communication system, the transmitters and receivers are Base Stations (BSs) and User Equipments (UEs), respectively.

In another embodiment, the UL performance metrics is optimized, where the transmitters and receivers are User Equipments (UEs) and Base Stations (BSs), using the same methods described below.

The first aspect of the invention concerns to a method, where each BS has knowledge of an estimated version of the channel towards its associated UEs, but not of the neighboring ones associated to other BSs, comprising:

a) sensing an uplink transmission at each BS from the UEs associated to other BSs;

b) processing at said BSs said uplink transmission for determining interference information;

c) adjusting each BS a transmit filter for a downlink transmission to associated UEs under an optimization transmission criterion and to mitigate interference towards UEs associated to other BSs.

d) said UEs on receipt of said downlink transmission adjusting its receive filter under an optimization reception criterion, and e) adjusting each UE a transmit filter using said receive filter for a further uplink transmission to be sensed by all BSs. Said adjusting of the uplink transmit filter at said UE is implemented in the digital signal processing (DSP) block at the UE.

Said adjustment of the downlink transmit filter at said BS is preferably implemented in the digital signal processing (DSP) block at the BS controller;

As transmit filter for downlink or uplink transmission is understood both the control of the transmit power and the selection of the transmit precoder. As receive filter for downlink transmission is understood the linear processing applied at UE for data demodulation.

Said adjusting of the transmit filter at BS in step c), the receive filter at UE in step d), and the transmit filter at UE in step e) is done in a decentralized way, where each transmitter (BS or UE) establishes the parameters of its transmission (transmit power and transmit precoding) based on local information available, and each receiver (UE) establishes the parameters of its reception (receive filter) based on local information available. For each BS, the local information for transmission includes knowledge of the channel towards its associated UEs and knowledge of the interference information that is acquired in step b). For each UE, the local information for reception includes knowledge of the equivalent channel (that is, the combined effect of the propagation channel and the transmit filter) with its associated BS and knowledge of the covariance matrix of the received interference-plus-noise. For each UE, the local information for transmission includes knowledge of the receive filter used for downlink reception, and possibly other system-established parameters.

For some embodiments, the method comprises further iterations of steps a) to e) to achieve a given level of interference mitigation.

For some embodiments of the method, at least one among the plurality of BSs and active UEs are equipped with one, two, three, four or more antennas, where said antennas can be collocated or distributed.

For some embodiments of the method, steps a) to e) are performed for at least one carrier frequency in a multicarrier system.

For some embodiments of the method, said processing of step b) comprises computing an interference cost matrix which is estimated as a function of the covariance matrix of the received interference-plus-noise signal at each BS from said uplink transmission from UEs associated to other BSs.

Said interference cost matrix reflects the interference created by BS towards UEs associated to other BSs.

For some embodiments of the method, said optimization of step c) of the downlink transmit filter of said BS to its associated UEs is done by taking into account: i) an estimated version of the channel towards its associated UEs, and ii) the interference cost matrix.

For some embodiments of the method, said optimization of step c) of the downlink transmit filter of said BS to its attached UE is done by taking into account: i) an estimated version of the channel towards its associated UEs, ii) the interference cost matrix that reflects the interference created by BS towards UEs associated to other BSs, and iii) the covariance matrix of the interference-plus-noise at the associated UEs.

Said adjusting of the downlink transmit filter as a function of the interference cost matrix allows to control the levels of transmitted power, and implicitly the levels of experienced interference by UEs associated to other BSs, and either maximize the total weighted sum of data rates of the system or minimize the total weighted sum of mean square errors of the system.

Said adjusting of the downlink transmit filter may be computed according to a robustness criterion that takes into account the error in channel estimation between each UE and its serving BS.

Said adjusting of the downlink transmit filter at said BS is implemented in the digital signal processing (DSP) block at the BS controller.

For one embodiment of the method, said downlink from each BS to corresponding served UE and said uplink from served UE to its BS do not involve data transmission, so that only spatially filtered symbols are transmitted.

For one embodiment of the method, said downlink from each BS to corresponding UE served includes data transmission, and said uplink from served UE to its BS does not involve data transmission.

For one embodiment of the method, said downlink from each BS to corresponding UE served does not include data transmission and said uplink from served UE to its BS involves data transmission.

For one embodiment of the method, both said downlink and said uplink involve data transmission.

For some embodiments of the method, each UE at step d) estimates the equivalent channel (that is the combined effect of the propagation channel and the transmit filter) towards its BS and the covariance matrix of the interference-plus-noise, and implements a downlink receive filter.

For some embodiments of the method, said UE based on said downlink receive filter, updates at step e) a corresponding uplink transmit filter.

Said adjusting of the uplink transmit filter at said UE is implemented in the digital signal processing (DSP) block at the UE.

For some embodiments of the method, each UE at step e) uses sounding reference signals defined in LTE-A release 11 properly configured for uplink transmission.

The method and systems of the present invention are applicable for any femtocell, picocell, microcell or macrocell base station with an IP-based backhaul link operating ADSL, ADSL2, ADSL2+, VDSL2, FTTx technologies or any other backhaul specification to the Core Network or to the Internet serving mobile or fixed wireless equipment terminals equipped with one, two, three, four or more antennas and configured to operate IS-95, CDMA, GSM TDMA, GPRS, EDGE, UMTS, WCDMA, OFDM, OFDMA, TD-SCDMA, HSDPA, LTE, LTE-A, WiMaX, 3GPP, and/or 3GPP2 signals.

The present invention circumvents the limitations of the prior art proposals by providing three main advantages:
  i) Provides a method that avoids the estimation of the interfering channels (propagation channels from BSs to UEs attached to other BSs in the same frequency/time resource). This way complexity, overhead and the impact of errors associated to the estimation of the interfering channels are significantly reduced.
  ii) Provides a method that avoids the exchange of control-plane messages among transmitters over the backhaul so as to manage interference. This way the impact of non-ideal backhaul links is significantly reduced.
  iii) Provides a method that can be implemented in a totally decentralized manner and which solution is fully scalable.

BRIEF DESCRIPTION OF THE DRAWINGS

The previous and other advantages and features will best be understood by reference to the following detailed description of several illustrative and not limitative embodiments when read in conjunction with the accompanying drawing, wherein:

FIG. 9 shows a list of parameters for a simulation scenario.

FIGS. 10a and 10b are used layout configurations for a simulation scenario.

FIGS. 11a and 11b show the sum throughput achieved on each resource block (RB) or subband for the layout configurations depicted in FIG. 10.

FIG. 12 shows a comparison of assumptions, requirements and implications of different methods for UL non-data transmission using sounding reference signals (SRS) in LTE-Advanced release 11 with the objective of broadcasting the interference cost.

FIG. 16 details in a Table the list of abbreviations and symbols used in this description.

DETAILED DESCRIPTION OF THE INVENTION

The notation used in this disclosure is detailed in the following. Scalars are denoted by italic letters. Boldface lower-case and upper-case letters denote vectors and matrices, respectively. The function $\log_2(\ )$ refers to the base-2 logarithm. For a given matrix A, its transpose matrix is denoted as $A^T$, its conjugate matrix as $A^*$, its transpose conjugate matrix as $A^H$ and the matrix inverse as $A^{-1}$. det(A) operator refers to the determinant of A, Tr(A) to the trace of A, and E{A} to the expectation operator of each component in A. Matrix I refers to the identity matrix.

In all the equations involving transmit or receive filters, the per-antenna power of the signal is normalized relative to the transmitter (BS or UE) maximum transmitted power.

Embodiments of the present invention are found in the following methods and systems for decentralized self-configuration of the power, transmit precoding and receive filter (or decoding), in a multi-cell deployment. In these embodiments, BSs and UEs can be equipped with one, two, three, four or more antennas. The antennas at each BS can be either spatially distributed or collocated.

Figure 1A:
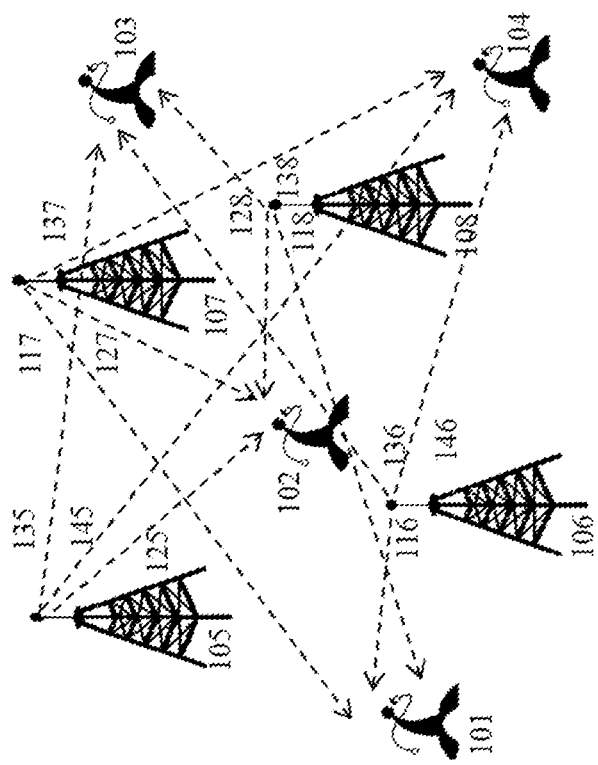
FIG. 1a illustrates the intended downlink signals from BSs towards its associated UEs in a TDD wireless communication system.
Figure 1B:
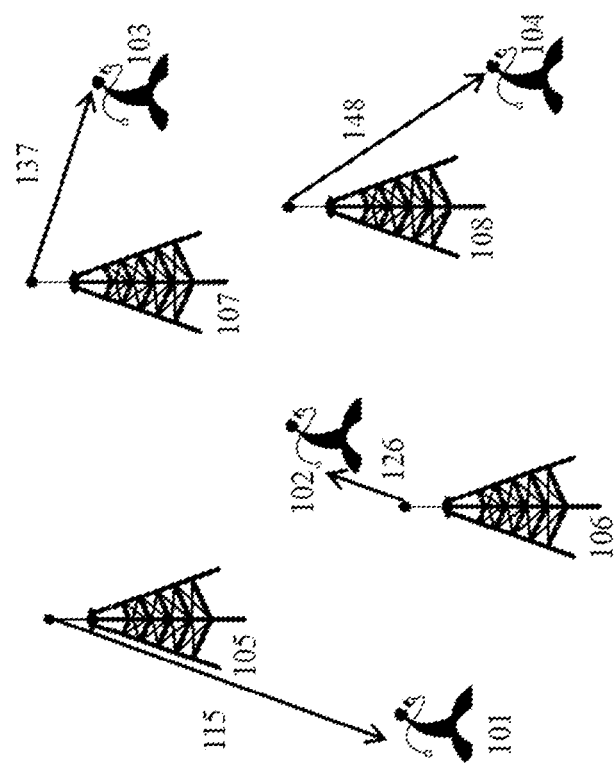
FIG. 1b illustrates the interfering downlink signals from BSs towards UEs attached to neighbor BSs in a TDD wireless communication system.

In reference to FIG. 1a and FIG. 1b, they illustrate the intended DL signals and the interfering DL signals, respectively, in a communication between several BSs and several UEs present in the network. BS 105 is serving UE 101, BS 106 is serving UE 102, BS 107 serves UE 103 and BS 108 serves UE 104. In FIG. 1a, links 115, 126, 137 and 148 represent the path gain between each BS and its serving UE. The interfering path gains are illustrated in FIG. 1b.

Figure 1C:
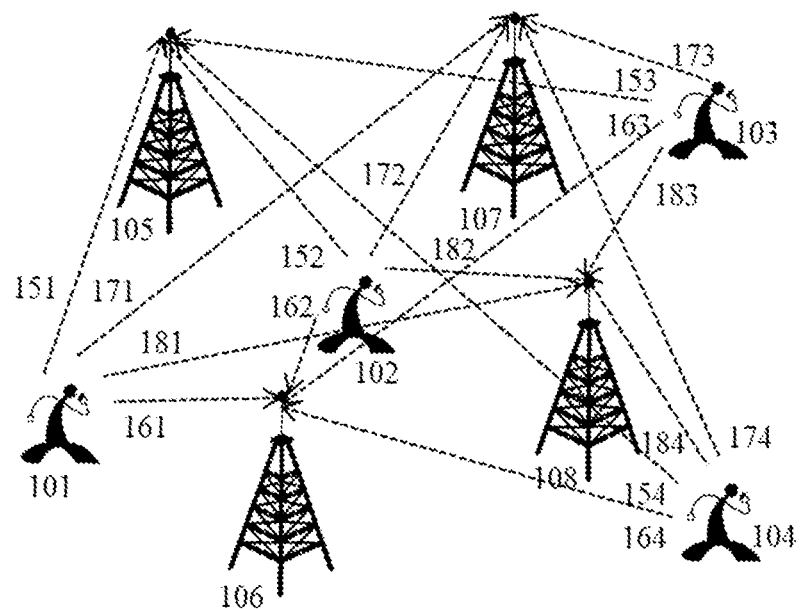
FIG. 1c illustrates the received uplink signals when all UEs transmit simultaneously in a TDD wireless communication system.

In reference to FIG. 1c, it illustrates the received UL signals in a communication between several UEs and several BSs, where the received UL signal at each BS comes from a plurality of UEs. Links 151, 161, 171, 181, 152, 162, 172, 182, 153, 163, 173, 183, 154, 164, 174 and 184 represent the path gain between each UE and each BS.

Figure 17:
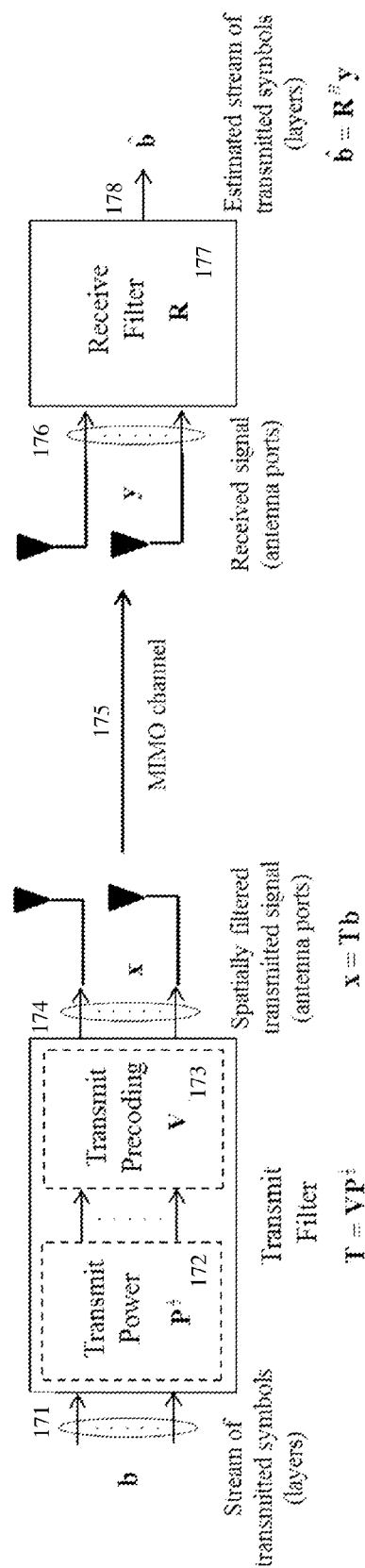
FIG. 17 shows the definition of linear transmit filter (including transmit power and transmit precoding) and linear receive filter in a multi-antenna wireless communication system between one transmitter and one receiver.

FIG. 17 illustrates the role of a linear transmit filter (T) and a linear receive filter (R) in a wireless communication between one transmitter and one receiver. It can be applied either for DL or for UL transmission. The stream of transmitted symbols b 171 is spatially filtered into the transmitted signal x 174 through the linear transmit filter T that includes transmit power $P^{1/2}$ 172 and transmit precoding V 173 as follows: $x = Tb = VP^{1/2}b$. The spatially filtered transmitted signal x has a length equal to the number of antennas at transmitter. After the wireless propagation through the MIMO channel 175, the received signal is denoted by y 176, which is spatially filtered using the linear receive filter R 177 in order to recover the stream of transmitted symbols as follows:

$\hat{b} = R^H y$ 178.

With the objective of maximizing the total weighted sum of data rates of the system, constrained by the maximum transmitted power at the $BS_i$, the DL transmit filters of BSs (or equivalently the transmit beam-formers, when one layer is transmitted per UE) are designed as the solution to the following optimization problem:

$$\underset{\{T_i\}\forall i}{\text{maximize}} \sum_{i=1}^{N} \mu_i r_i \qquad (1)$$

$$\text{s.t. } Tr(T_i T_i^H) \leq P_i^{max} \ \forall i,$$

where N is the total number of BS-UE pairs considering that each BS serves a single user in a given time/frequency resource, $\mu_i$ is the user priority coefficient of $UE_i$, $r_i$ is the data rate of $UE_i$, $T_i$ is the DL transmit filter of the signal transmitted to $UE_i$, $P_i^{max}$ is the maximum available transmit power at $BS_i$ and Tr(.) denotes the trace operator. The proper update of the user priority coefficients ($\mu_i$) can shape the system performance, from the greedy to the proportional fair operation mode [Kelly-98]. The data rate of $UE_i$ is understood as the Shannon Capacity limit for the transmission towards $UE_i$:

$$r_i = \log_2 \det(I + H_{i,i} T_i T_i^H H_{i,i}^H N_i^{-1}), \qquad (2)$$

where $H_{i,i}$ denotes the complex channel matrix between $BS_i$ and its own $UE_i$, which contains the channel gains between each UE antenna element and each BS antenna element, de(.) stands for the determinant operator, I refers to the identity matrix and $N_i$ corresponds to the covariance matrix of the received noise-plus-interference at $UE_i$:

$$N_i = \sum_{\substack{j=1 \\ j \neq i}}^{N} H_{j,i} T_j T_j^H H_{j,i}^H + \Sigma_i, \qquad (3)$$

where $H_{j,i}$ denotes the complex channel matrix between $BS_j$ and $UE_i$, $T_j$ is the DL transmit filter matrix of the signal transmitted to $UE_j$ attached to neighbor $BS_j$ and $\Sigma_i$ refers to the covariance matrix of the received noise at $UE_i$. In case the noise could be modeled as additive white Gaussian noise: $\Sigma_i = \sigma_i^2 I$, being $Y_i^2$ the received noise power. Finally, superscripts H and −1 indicate the Hermitian transpose and the inverse operation, respectively.

Due to the interference existing on the scenario, the previous problem is not convex and the optimal solution cannot be guaranteed. Nevertheless, it can be shown [Christensen-08][Shi-11] that one solution can be obtained by solving the following problem that considers minimization of the total weighted sum of mean square errors (MSEs) of the system, constrained by the maximum transmitted power at the $BS_i$:

$$\underset{\{T_i\},\{R_i\}\forall i}{\text{minimize}} \sum_{i=1}^{N} Tr(W_i E_i) \qquad (4)$$

$$\text{s.t. } Tr(T_i T_i^H) \leq P_i^{max} \ \forall i,$$

where $W_i$ is the error weighting matrix associated to $UE_i$ and $E_i$ corresponds to the MSE-matrix, which contains in its diagonal the MSE for the symbols transmitted towards $UE_i$:

$$E_i = I + R_i^H H_{i,i} T_i T_i^H H_{i,i}^H R_i - R_i^H H_{i,i} T_i + R_i^H N_i R_i, \qquad (5)$$

where $R_i$ corresponds to the DL receive filter at $UE_i$, defined in continuation in (12).

Problem in (4) is convex on DL transmit filters for a fixed DL receive filters, and the other way round. Further, optimal expressions for DL transmit filters can be derived analytically for a fixed set of DL receive filters, and the other way round. So, a local optimum of the problem in. (4) can be found by alternate optimization between DL transmit filters and DL receive filters.

In case $$W_i = \mu_i I, \quad (6)$$

then, the sum of mean square error of the system is minimized. In contrast, see [Christensen-08][Shi-11], the maximization of the total weighted sum of data rates of the system (problem presented in (1)) is obtained by using:

$$W_i = \mu_i \bar{E}_i^{-1}, \quad (7)$$

being $\bar{E}_i$ the MSE-matrix obtained every time the transmitters and receivers are updated (in the previous iteration of the alternate optimization between DL transmit filters and DL receive filters).

The problem in (4), which is solved in a centralized mode in the prior art, is solved in this invention in a decentralized way; each $BS_i$ optimizes the DL transmit filter $T_i$ towards its associated $UE_i$ according to:

$$\underset{T_i, R_i}{\operatorname{minimize}} Tr(W_i E_i) + Tr(\Upsilon_i T_i T_i^H), \quad (8)$$

$$\text{s.t. } Tr(T_i T_i^H) \leq P_i^{max}$$

where $\Upsilon_i$ is an interference cost matrix that reflects the interference created by $BS_i$ towards users in neighboring cells and is equal to:

$$\Upsilon_i = \sum_{\substack{j=1 \\ j \neq i}}^{N} H_{i,j}^H R_j W_j R_j^H H_{i,j}, \quad (9)$$

where $H_{i,j}$ denotes the complex channel matrix between $BS_i$ and $UE_j$ attached to $BS_j$, and $R_j$ is the DL receive filter of the signal transmitted to $UE_j$ by its serving BS, presented in (5), continuation in (12).

The decentralized problem in (8) is convex on the DL transmit filter $T_i$ and the DL receive filter $R_i$, separately, and the optimal expressions can be analytically derived.

Transmit filter design at each BS: for a given interference cost matrix $\Upsilon_i$, problem in (8) can be solved at each $BS_i$ by alternate optimization between the DL transmit filter and the DL receive filter, which expressions are given next:

$$T_i = (H_{i,i}^H R_i W_i R_i^H H_{i,i} + \Upsilon_i + \lambda_i I)^{-1} H_{i,i}^H R_i W_i$$

$$R_i = (H_{i,i} T_i T_i^H H_{i,i}^H + N_i)^{-1} H_{i,i} T_i$$

where $\lambda_i$ is a scalar parameter that allows to meet the transmit power constraint in (8).

Such alternate optimization between transmit and receive filters at each BS requires knowledge of the interference cost matrix $\Upsilon_i$, an estimated version of the MIMO propagation channel $H_{i,i}$ and the interference-plus-noise covariance matrix at the UE $N_i$. So, each UE should report $N_i$ to the serving BS. In case such report is not possible, alternative approximations can be used: i) if the UE can report the interference-plus-noise received power (denoted by $P_{N_i}$), then $N_i = P_{N_i} I$ could be used in (10), ii) if no kind of report from the UE is possible the transmit filters at each BS could be computed following the first equation in (10) based on the knowledge of. Further alternatives could be proposed.

Such optimization at each BS is implemented in the digital signal processing (DSP) block at the BS controller.

The DL transmit filter $T_i$ includes both the transmit power (represented by a diagonal real-valued matrix $P_i^{1/2}$) and the transmit precoding (represented by a spatial complex-valued matrix $V_i$). So, after the optimization and for practical implementation, $T_i$ can be decomposed as:

$$T_i = V_i P_i^{1/2}, \quad (11)$$

Receive filter design at each UE: once designed the DL transmit filters for each $BS_i$, $T_i$, the DL receive filter at each $UE_i$ is obtained following an MMSE criterion as:

$$R_i = (H_{i,i} T_i T_i^H H_{i,i}^H + N_i)^{-1} H_{i,i} T_i, \quad (12)$$

which can be implemented at each UE based on the estimation of the equivalent channel $H_{i,j} T_j$ that includes propagation and transmit filter, and the estimation of the covariance matrix of the received interference-plus-noise signal $N_i$. In 3GPP LTE-A [3GPP-TR36829], DL receive filter in (12) corresponds to the linear MMSE interference rejection combiner (LMMSE-IRC).

The decentralized problem in (8) can easily be extended to the following cases:

1) Each BS serves multiple UEs simultaneously on the same time and frequency resource (multi-user MIMO). The decentralized problem to be solved at $BS_i$ is:

$$\underset{\{T_{n_i}\},\{R_{n_i}\}_{\forall n}}{\operatorname{minimize}} \sum_{n=1}^{N_i} Tr(W_{n_i} E_{n_i}) + Tr(\Upsilon_i T_{n_i} T_{n_i}^H), \quad (13)$$

$$\text{s.t. } \sum_{n=1}^{N_i} Tr(T_{n_i} T_{n_i}^H) \leq P_i^{max}$$

where sub-index $n_i$ refers to user n served by $BS_i$, $N_i$ is the total number of users attached to $BS_i$. The MSE-matrix $E_{n_i}$ and the received noise-plus-interference covariance matrix $N_{n_i}$ at user n served by $BS_i$ are given by $$E_{n_i} = I + R_{n_i}^H H_{i,n_i} T_{n_i} T_{n_i}^H H_{i,n_i}^H R_{n_i} - \quad (14)$$

$$R_{n_i}^H H_{i,n_i} T_{n_i} - T_{n_i}^H H_{i,n_i}^H R_{n_i} + R_{n_i}^H N_{n_i} R_{n_i}$$

$$N_{n_i} = \sum_{\substack{n_j=1 \\ n_j \neq n_i}}^{N_n} H_{i,n_i} T_{n_j} T_{n_j}^H H_{i,n_i}^H + \sum_{\substack{m=1 \\ m \neq n}}^{N} \sum_{m_j=1}^{N_m} H_{j,n_i} T_{m_j} T_{m_j}^H H_{j,n_i}^H + \Sigma_{n_i}.$$

2) Per-antenna or per group of antennas power constraints are included to the optimization problem. The decentralized problem to be solved is:

$$\underset{T_i, R_i}{\operatorname{minimize}} Tr(W_i E_i) + Tr(\Upsilon_i T_i T_i^H), \quad (15)$$

$$\text{s.t. } Tr(B_l T_i T_i^H) \leq P_i^{max} \; l = 1, \ldots, L$$

where $B_l$ denotes a matrix with all zeros except for the diagonal elements that refer to the antennas indexes included in the lth group of antennas power constraint or individual power constraint, in which it has a one. If per-antenna power constraints are considered, L coincides with the number of transmit antennas.

3) A plurality of carrier frequencies, as in a multicarrier system, is available. The decentralized problem to be solved is:

$$\min_{T_i^k, R_i^k} \text{imize } Tr(W_i^k E_i^k) + Tr(\Upsilon_i^k T_i^k T_i^k), \quad \begin{array}{c} \forall k \\ \forall i \end{array} \quad (16)$$

$$\text{s.t. } Tr(T_i^k T_i^{k\,H}) \leq P_i^{k\,max}$$

where super-index k refers to the carrier frequency and $P_i^{k\,max}$ is the available transmit power for carrier frequency k at $BS_i$.

4) Maximum transmission rate constraints are considered, as it happens for the maximum modulation coding schemes (MCS) allowed at the LTE. The decentralized problem to be solved is:

$$\min_{T_i, R_i} \text{imize } Tr(W_i E_i) + Tr(\Upsilon_i T_i T_i^H), \quad \forall i \quad (17)$$

$$\text{s.t. } Tr(T_i T_i^H) \leq P_i^{max}$$

$$-\log_2 \det(E_i) \leq r_i^{max}$$

where $r_i^{max}$ is the transmission rate at $UE_i$ supported by the maximum modulation and coding scheme.

Previous cases can be properly combined to encompass all features.

EMBODIMENTS

The objective of Embodiment 1 is to describe the communication process and the configuration of the system parameters required to acquire the interfering cost, (9), at each BS present in the wireless communication system. Embodiments 2, 3 and 4 provide a detailed description of the systems for implementing the method of the invention. More specifically, they describe different iterative procedures so as to iterate between DL and UL transmissions through which the self-configuration of the transmit filter (including transmit power and transmit precoding) and the receive filter is achieved while preemptively managing the interference created in the network.

Embodiment 1

The knowledge of the interference cost matrix $\gamma_i$, (9), at $BS_i$ allows managing the interference created by $BS_i$ towards unintended UEs attached to other BSs.

Figure 2:
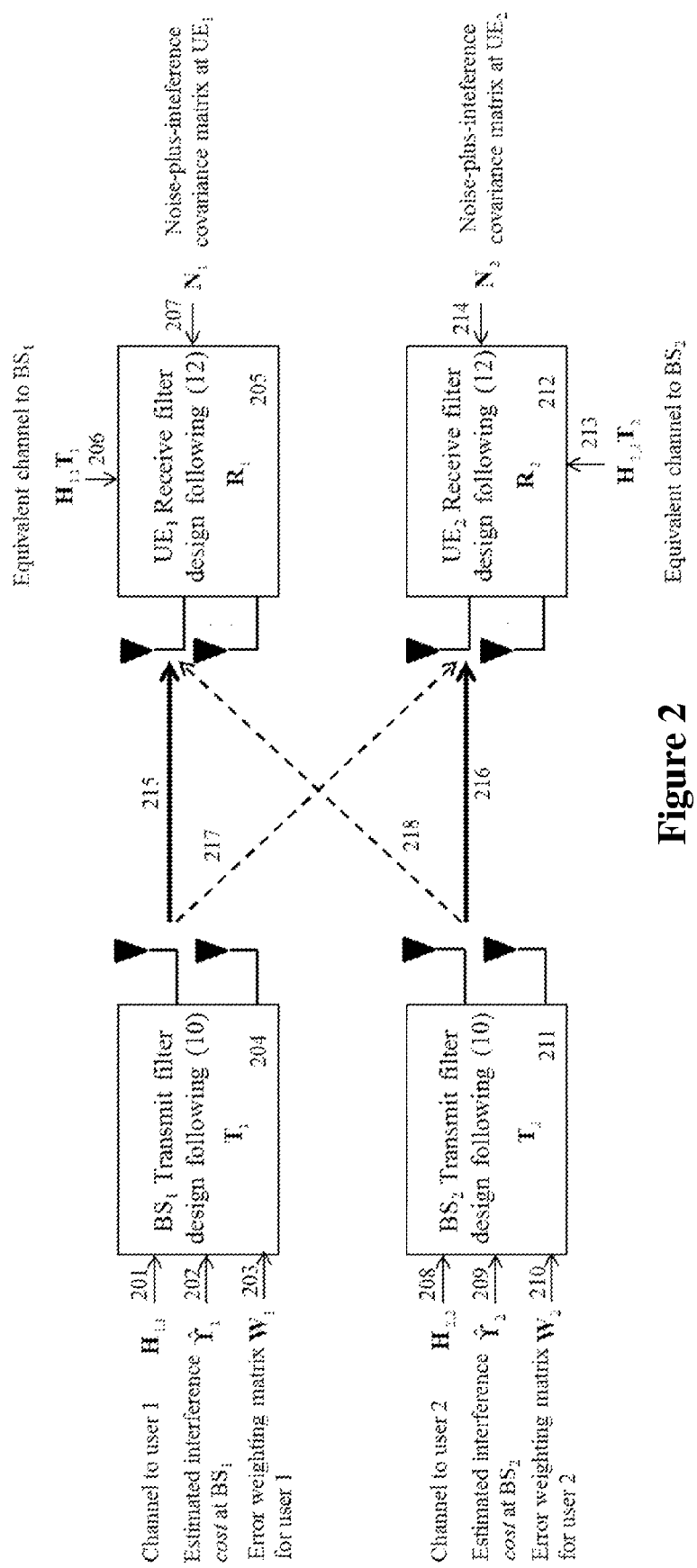
FIG. 2 illustrates a method for DL transmit and receive filters design according to the first embodiment of the invention.

In this regard, FIG. 2 illustrates how the DL transmit and receive filters are designed in a deployment with 2 BSs and 1 UE attached to each BS. First, each $BS_i$ designs its DL transmit filter $T_i$ (along with $R_i$) based on the equation (10), using the knowledge of the channel matrix towards its associated UE $H_{i,i}$ (201, 208), the weighting matrix $W_i$ (203, 210) and an estimation of the interference cost matrix $\hat{\gamma}_i$ (202, 209). The design is done by solving the decentralized optimization problem in (8)(or one of the extended versions in (13), (15), (16), or (17)) with $\gamma_i$, $\hat{\gamma}_i$=(204, 211). Then, the DL receive filter $R_i$ is computed at each $UE_i$ (205, 212) by means of equation (12) based on the knowledge of the equivalent complex channel matrix towards its associated BS $H_{i,i}T_i$ (205, 212), and the covariance matrix of the received interference-plus-noise $N_i$ (207, 214). At each $UE_i$, the knowledge of $H_{i,i}$ and $T_i$ is obtained jointly through the estimation of a single variable: $H_{i,i}T_i$.

Each BS can have an estimation of the interference cost matrix $\gamma_i$ by exploiting the received signal in the uplink if the following two conditions are satisfied:

1) propagation channel reciprocity can be assumed, as in a TDD system with slow varying channel for duplexing UL and DL transmissions, and 2) UEs transmit simultaneously in the UL with a UL transmit filter (defined in next equation (19)) that is designed for each $UE_i$ based on its DL receive filter $R_i$, its weighting matrix $W_i$ and its maximum transmitted power.

If the first condition is satisfied, the covariance matrix of the received interference-plus-noise signal at $BS_i$ in the UL transmission $\omega_i$ is:

$$\Psi_i = \sum_{\substack{j=1 \\ j \neq i}}^{N} H_{i,j}^T \overleftarrow{T}_j \overleftarrow{T}_j^H H_{i,j}^* + \overleftarrow{\Sigma}_i, \quad (18)$$

where $\overleftarrow{T}_j$ denotes the UL transmit filter of the signal transmitted by $UE_j$ and $\overleftarrow{\Sigma}_i$ refers to the covariance matrix of the received noise at $BS_i$. Superscripts T and * indicate the transpose and the complex conjugate operation, respectively.

Furthermore, if the UL transmit filters are designed according to:

$$\overleftarrow{T}_j = \sqrt{F} R_i^* W_i^{1/2*}, \quad (19)$$

where F<1 is a common cell-wide scaling factor (the same for all UEs in the system) that allows to restrict the transmit power used at UEs, and the superscript ½ refers to the Cholesky decomposition $W_i = W_i^{1/2}(W_i^{1/2})^H$, then the interference cost matrix $\gamma_i$ can be estimated from the received signal at $BS_i$ as a function of the complex conjugate of the covariance of the received interference-plus-noise signal in the UL transmission ($\psi_i$):

$$\hat{\gamma}_i = F^{-1}\Psi_i^*, \quad (20)$$

where $\hat{\gamma}_i$ denotes the estimation of the interference cost matrix $\gamma_i$.

Figure 3:
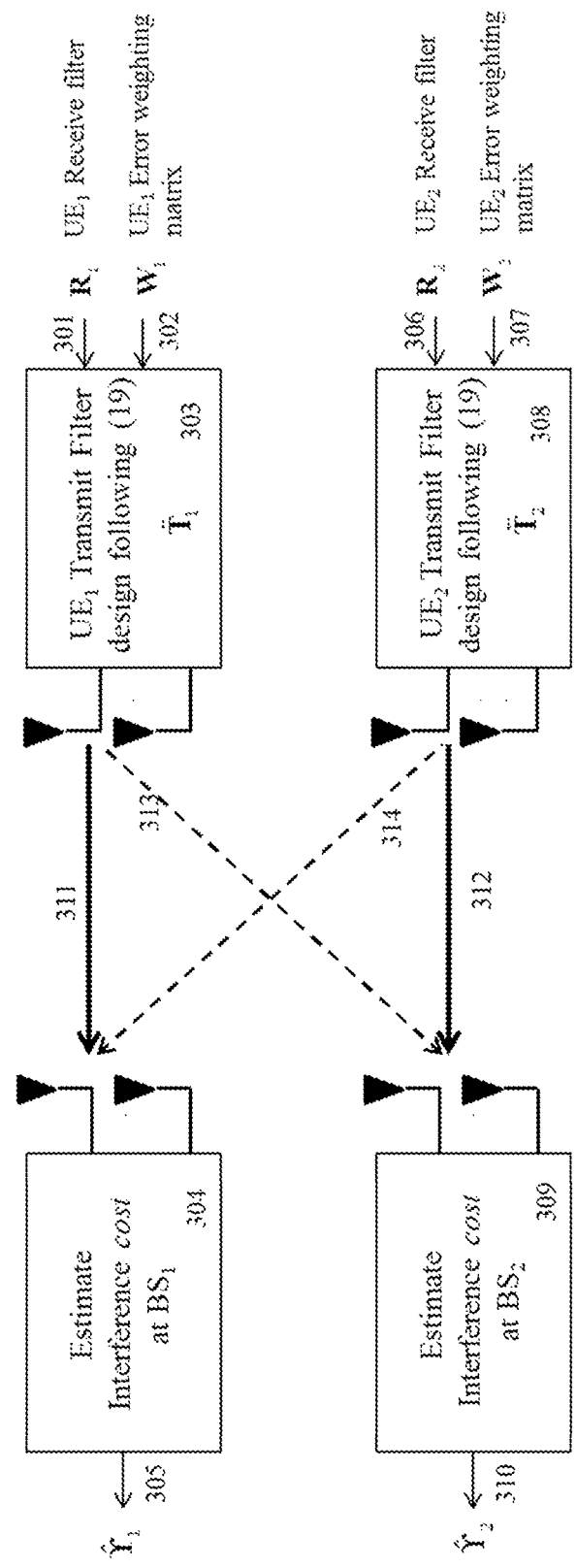
FIG. 3 illustrates a method for UL transmit and receive filters design according to the first embodiment of the invention.

FIG. 3 illustrates how each BS obtains knowledge of the interference cost matrix $\gamma_i$ thanks to the proper design of UL transmit filters at the UEs, for a simple deployment with 2 BSs and 1 UE attached to each BS. UL transmit filters are designed according to (19) (303, 308), based on the knowledge of the DL receive filter $R_i$ (301, 306) and the weighting matrix $W_i$ (302, 307). Then, each $BS_i$ estimates its interference cost matrix $\gamma_i$ based on the covariance matrix of the received interference-plus-noise signal in the UL.

Notice that, in the UL transmission there is no need for BSs to receive data content from the signals transmitted by UEs. Hence, spatially filtered symbols can be transmitted.

Figure 4:
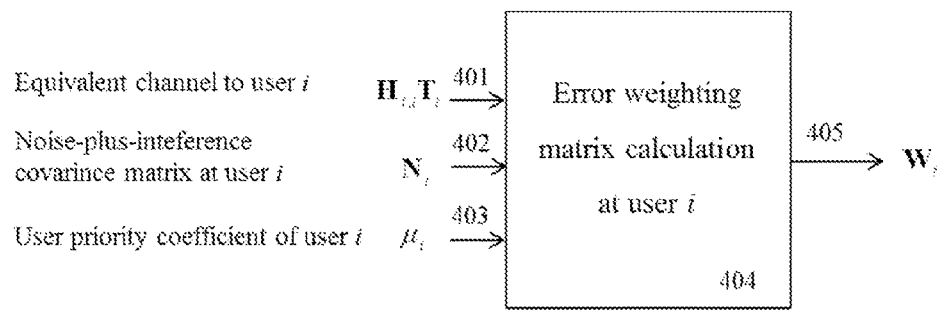
FIG. 4 illustrates a method for computing a system parameter according to an embodiment of the invention.

Due to the fact that UL transmit filters design of UE depends on the weighting matrix $W_i$, FIG. 4 illustrates how the weighting matrix $W_i$ is calculated at $UE_i$ following equation (7) when the objective is the maximization of the system weighted sum of data rates with constraints on the total transmitted power at BSs. The proper design of $W_i$ depends on the user priority coefficient of $UE_i$ $\mu_i$ (403) and on its MSE-previous matrix $\bar{E}_i$ that can be calculated using (5), which is obtained at $UE_i$ based on the knowledge of the equivalent complex channel matrix towards its associated BS $H_{i,i}T_i$ (401), and the interference-plus-noise covariance matrix $N_i$ (402).

Embodiment 2

Figure 6:
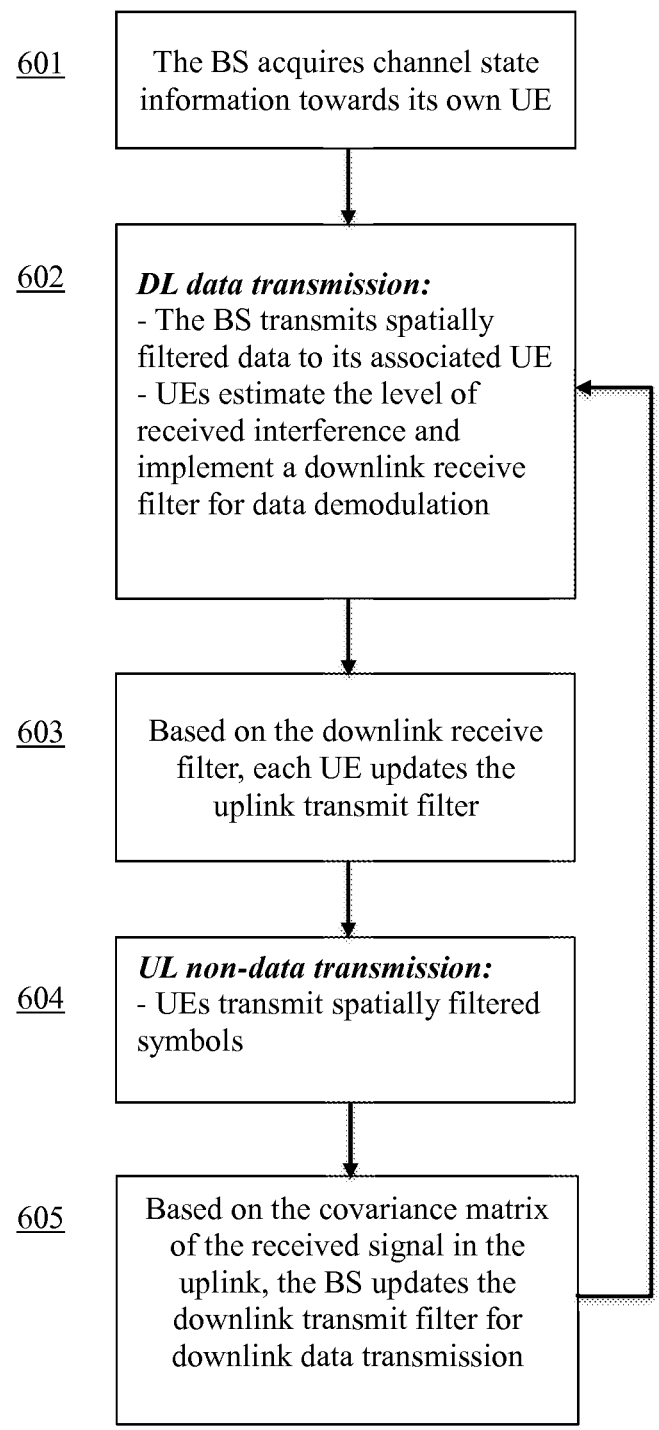
FIG. 6 is a block diagram of a system describing the second embodiment of the invention.

FIG. 6 illustrates the block diagram corresponding to Embodiment 2 as applied to a wireless cellular communication system. First, each base station $BS_i$ acquires or updates the knowledge of the complex channel matrix towards its own $UE_i$ $H_{i,i}$ (601), which contains the channel gains between each UE antenna element and each BS antenna element. The channel state acquisition can be done either at the BS by exploiting channel reciprocity or at the UE and then reported to the BS. Once this information is available at $BS_i$, the DL transmit and receive filters are calculated in a decentralized manner as it is described in Embodiment 1 and FIG. 2, and DL data transmission is carried out (602). Based on the knowledge of the DL receive filter at each UE, the UL transmit filter is designed as it is described in Embodiment 1 and FIG. 3 (603) and an UL non-data transmission is carried out (604). The UL non-data transmission by non-associated $UE_j$ allows $BS_i$ to estimate the interference cost matrix based on the covariance matrix of the received UL interference-plus-noise signal and, based on this estimation, the DL transmit filters are updated in a decentralized manner (605) as it is described in Embodiment 1 and FIG. 2. Then, previous steps are repeated from 602 to 605.

Figure 5A:
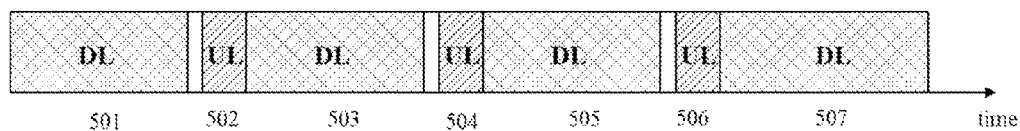
FIG. 5a illustrates a method related to the second embodiment of the invention in a TDD wireless communication system.

FIG. 5a illustrates these steps as applied to a TDD wireless communication system. 501, 503, 505 and 507 correspond to intervals devoted for DL data transmissions; 502, 504 and 506 refer to intervals allocated for UL non-data transmissions. Each time that an UL non-data transmission (short interval duration) is carried out, the DL transmit and receive filters are updated and system performance (in terms of weighted sum of data rates) is increased.

Embodiment 3

Figure 7:
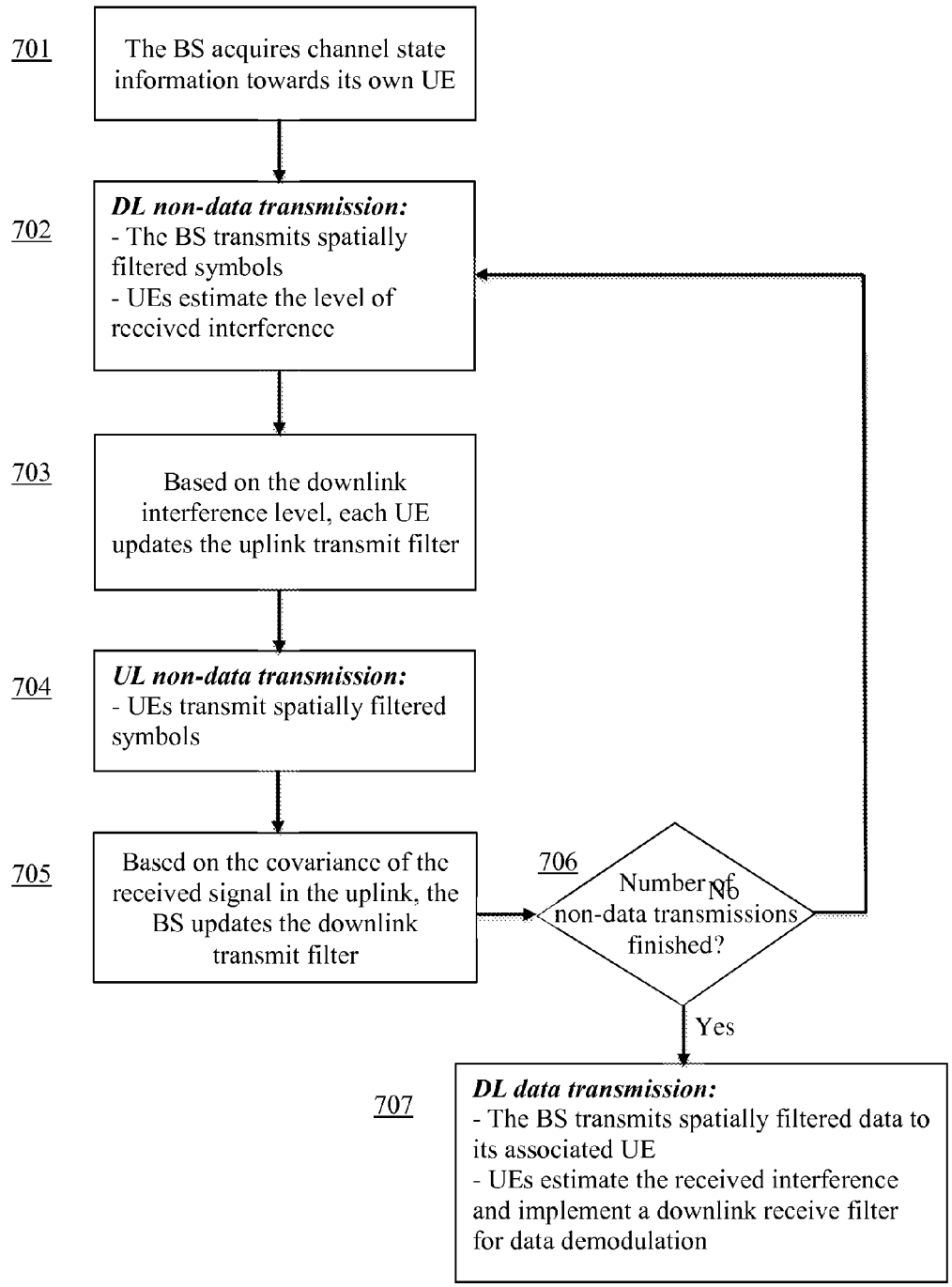
FIG. 7 is another block diagram of a system regarding the third embodiment of the invention.

FIG. 7 illustrates the block diagram corresponding to Embodiment 3 as applied to the DL of a wireless cellular communication system. First, each base station $BS_i$ acquires or updates the knowledge of the complex channel matrix towards its own $UE_i$ $H_{i,i}$ (701), which contains the channel gains between each UE antenna element and each BS antenna element. The channel state acquisition can be done either at the BS by exploiting channel reciprocity or at the UE and then reported to the BS. Once this information is available at $BS_i$ the DL transmit filters are calculated in a decentralized manner as it is described in Embodiment 1 and FIG. 2, and DL non-data transmission is carried out (702). Based on the knowledge of the received interference-plus-noise at each UE, the UL transmit filter is designed as it is described in Embodiment 1 and FIG. 3 (703) and an UL non-data transmission is carried out (704). The UL non-data transmission allows $BS_i$ to estimate the interference cost matrix based on the covariance matrix of the received UL interference-plus-noise signal and, based on this estimation, the DL transmit filters are updated in a decentralized manner as it is described in Embodiment 1 and FIG. 2 (705). The DL and UL non-data transmissions are repeated until the optimal performance is achieved or the maximum allowed number of iterations is reached. Then, DL data transmission is carried out (707), where transmit and receive filters are computed in a decentralized manner as it is described in Embodiment 1 and FIG. 2 as long as the channel coefficients do not change.

Figure 5B:
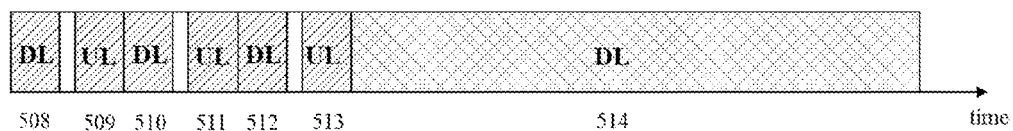
FIG. 5b illustrates another method regarding the third embodiment of the invention in a TDD wireless communication system.

FIG. 5b illustrates these steps as applied to a TDD wireless communication system. 508, 510 and 512 correspond to intervals devoted for DL non-data transmissions; 509, 511 and 513 refer to intervals allocated for UL non-data transmissions; and 514 corresponds to the interval devoted for DL data transmission. Each time that an UL non-data transmission is carried out, the DL transmit filters are updated and they are used for DL non-data transmission in order to update the DL receive filters. This alternate DL and UL non-data transmission can be repeated one or several times until, at the end, DL data transmission is carried out.

Embodiment 4

Figure 8:
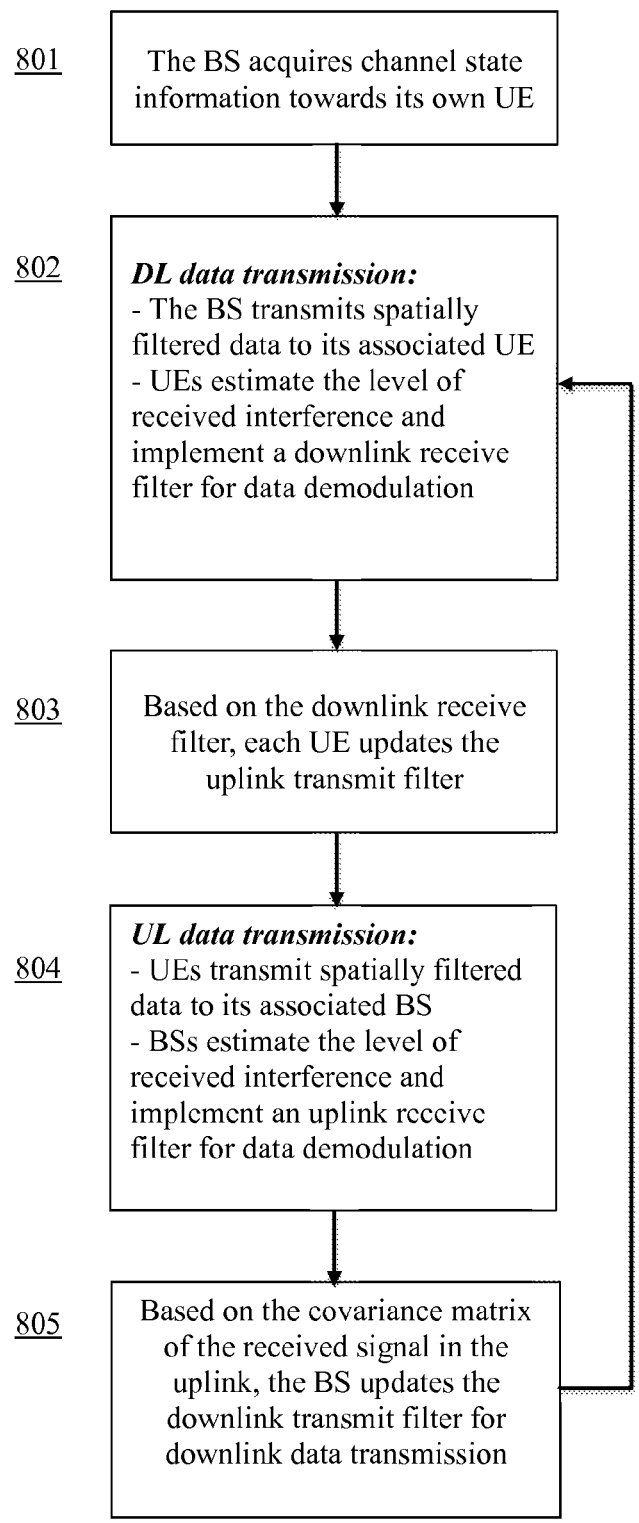
FIG. 8 is a further block diagram related to a system of the fourth embodiment of the invention.

FIG. 8 illustrates the block diagram corresponding to Embodiment 4 as applied to a wireless cellular communication system. First, each base station $BS_i$ acquires or updates an estimation of the complex channel matrix towards its own user i $H_{i,i}$ (801), which contains the channel gains between each UE antenna element and each BS antenna element. The acquisition of the channel state estimation can be done either at the BS by exploiting channel reciprocity or at the UE and then reported to the BS. Once this information is available at $BS_i$, the downlink transmit and receive filters are calculated in a decentralized manner as it is described in Embodiment 1 and FIG. 2, and DL data transmission is carried out (802). Based on the knowledge of the DL receive filter at each $UE_i$ the UL transmit filter and the UL receive filter are designed as it is described in Embodiment 1 and FIG. 3 (803) and UL data transmission is carried out (804). The UL data transmission in addition to exchange data with BS it allows $BS_i$ to estimate the interference cost matrix based on the covariance matrix of the received UL interference-plus-noise signal.

During UL data transmission reference signals should be considered in order that each BS could estimate the actual transmit filter used by its associated UE and, hence, receive the data.

The DL transmit filters are updated in a decentralized manner as it is detailed in Embodiment 1 and FIG. 2 (805). Then, previous steps are repeated from 802 to 805.

Figure 5C:
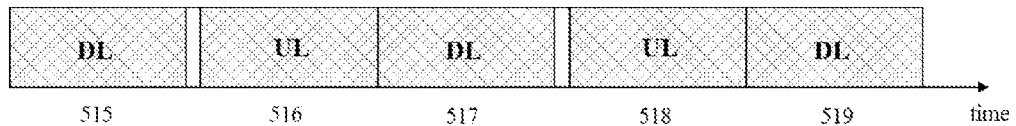
FIG. 5c illustrates a further method related to the fourth embodiment of the invention in a TDD wireless communication system.

FIG. 5c illustrates these steps as applied to a TDD wireless communication system. 515, 517 and 519 correspond to intervals devoted for DL data transmissions; 516 and 508 refer to intervals allocated for UL data transmissions. Each time that an UL data transmission is carried out, the DL transmit and receive filters are updated and system performance is increased.

Simulation Results

The simulated scenario follows the Small Cell Scenario #2a in [3GPP-SCE]. A list of parameters is provided in FIG. 9.

The simulations targeted the Scenario #2a with one cluster per macrocell area and 4 or 10 small cells per cluster. In [3GPP-SCE], the cluster defines the area where small cells are deployed. FIG. 10 shows the cluster, macrocell, small cell and user location for each layout configuration.

The following interference management techniques are evaluated:
  Decentralized Coordinated Beamforming with precoding design based on Channel Reciprocity for interference coordination (Decent. CB with CR in figures): interference management technique detailed in Embodiment 1.
  Decentralized Beamforming without Interference Management (Decent. B without IM in figures): No management of interference is performed, each BS designs its transmit filters to combat the received noise plus interference at its associated UE.
  Enhanced Inter-Cell Interference Coordination with Time Domain Muting and a muting ratio equal to 5/10 (eICIC TDM 5/10 in figures): interference is managed thanks to almost blank subframes, in which each BS is muted 5 subframes and transmits the other 5 subframes.

The performances of said techniques are evaluated for users served by small cells in the 3.5 GHz band.

The performance indicator is Sum Throughput (ST) per macrocell area measured in bits/s/Hz and defined as:
ST=total amount of data for all users in 3.5 GHz/total amount of observation time/total amount of bandwidth/number of macrocells FIG. 11 shows the ST achieved on each resource block (RB) or subband for the layout configurations depicted in FIG. 10. Significant ST gains are observed thanks to the proposed interference management technique for precoding design based on channel reciprocity.

Application to the 3GPP LTE-Advanced Release 11

Embodiments 2 and 3 of the present invention use a UL non-data transmission to get the desired information for DL precoding design. Said step can be done in LTE-Advanced standard by using the already defined UL Sounding Reference Signals (SRS) properly configured.

SRS Configuration

The SRS configuration involves:
  Periodicity of the SRS: 2, 5, 10, 20, 40, 80, 160 or 320 ms;
  SRS mode: frequency-hopping mode or wide-band mode. In the frequency-hopping mode the SRS are transmitted on a specific subband, while in the wide-band mode the SRS are transmitted in all the UL bandwidth; and
  Hopping scheduling (in case of frequency-hopping mode), which indicates the subband to be used by the UE at each time instant.

For the embodiments of the present invention, the proper configuration of the SRS involves frequency-hopping mode because the sounding has to be different for each subband the user is scheduled to as the DL interference to be managed varies among subbands. The periodicity of the SRS and the hopping scheduling depend on the specific method to be adopted. However, as SRS are allocated to the last OFDM symbols of the Uplink Pilot Time Slot (UpPTS) in the synchronization (SYNC) subframe in a TDD system [3GPP-SCE], the minimum periodicity of the SRS is 5 ms which corresponds to the DL-to-UL switch-point periodicity.

The limitations in the LTE-Advanced release 11 are:
  Component carrier specific UL power control is available, but there is not component subband specific UL power control. So, for a given time instant, the user can only do the UL sounding adjusting the UL transmit filter in a specific subband. In case that component subband specific UL power control was available, a user could be assigned to multiple subbands and do the UL sounding for these subbands simultaneously in time.
  The baseline for SRS operation is non-precoded and antenna-specific, i.e. SRS are transmitted using only one antenna. This fact implies that, as the UE has more than 1 DL receive antenna, multiple SRS transmissions multiplexed in time are needed (the same as the number of DL receive antennas) to get the desired UL signal at the cost of increasing the received noise. If a new type of SRS was defined, only 1 SRS transmission would be required independently of the number of DL receive antennas at the UE.
  The current SRS have a minimum length equivalent to 4 RBs. If a new type of SRS was defined, more sounding granularity could be obtained to adapt the design according to channel variations.

In the following, different methods are described based on the modifications that the LTE-Advanced standard could admit or not. For each method, assumptions, SRS configuration, requirements and implications are detailed in FIG. 12. Small Cell Scenario #2a in [3GPP-SCE] and a low mobility scenario are used, such that the channel coherence time ($T_c$) is 25 ms at 3.5 GHz band and user speed of 3 Km/h. Then, the maximum SRS periodicity is 20 ms. The total bandwidth is described by the number of resource blocks (RBs): B=16, and S refers to the number of subbands in which the B RBs are divided.

Methods A and B in the sequel do not require any modification in LTE-Advanced release 11.

In Method A, the sounding is done in all subbands simultaneously in time, so that each UE can only be scheduled to a single subband as it is not able to apply component subband power control.

In Method B, the sounding for each subband is done in different time instants, hence implying that a specific UE could be scheduled to multiple subbands but the number of subbands is limited by the channel coherence time.

Method C uses component subband specific UL power control. Such procedure becomes independent of the number of subbands and allows more flexibility in the user scheduling process and SRS periodicity than methods A and B.

Method D uses component subband specific UL power control and the definition of a new type of SRS including precoding and a minimum length equivalent to 1 RB. Method D is non-dependent of the number of subbands, the number of receive antennas at user nor inter-subband channel variations, hence allowing more flexibility in the user scheduling process, SRS periodicity and sounding granularity than previous methods.

Figure 13A:
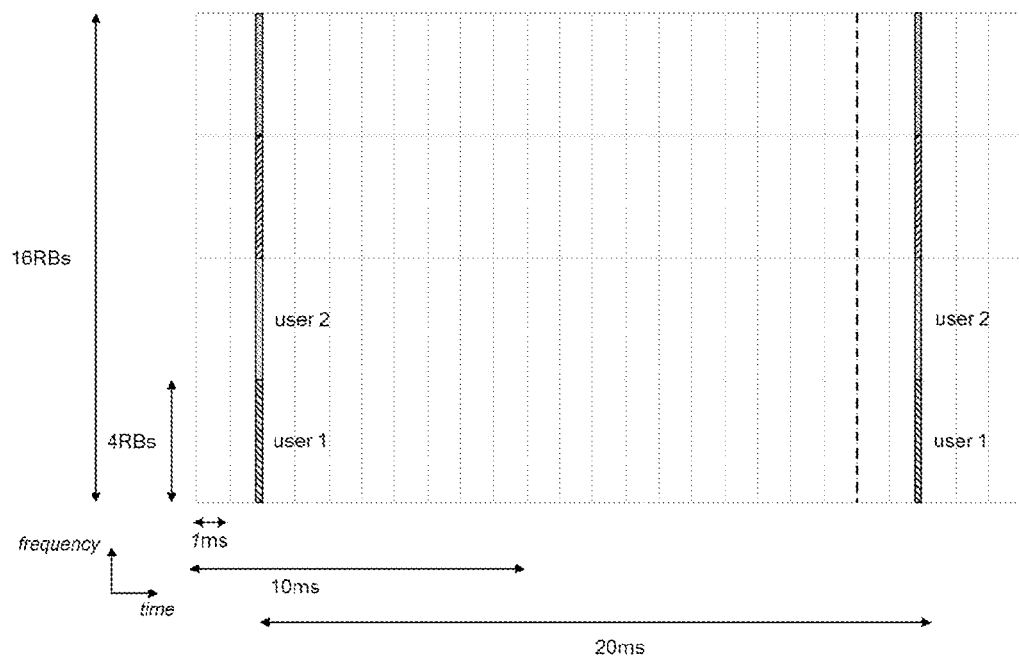
FIG. 13a illustrates a method for UL non-data transmission using SRS in LTE-Advanced.
Figure 13B:
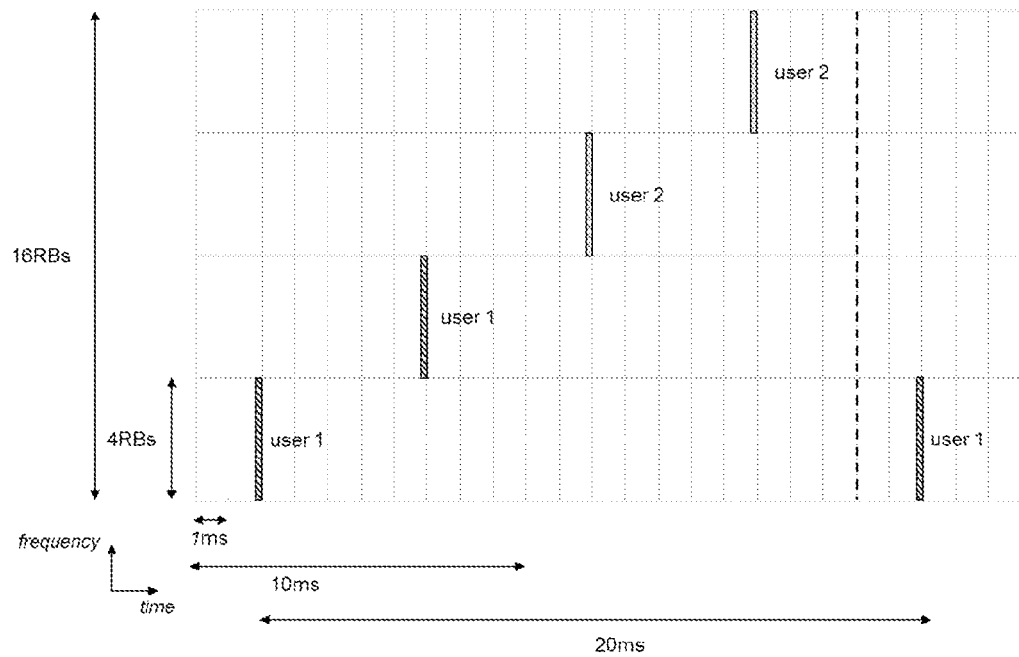
FIG. 13b illustrates another method for UL non-data transmission using SRS in LTE-Advanced release 11.

FIG. 13a and FIG. 13b illustrate Method A and Method B, respectively, in a time/frequency grid for B=16 RBs and S=4 subbands. Assuming that a specific BS has 2 users to be scheduled, a possible scheduling of UEs in the available subbands is shown.

Figure 14A:
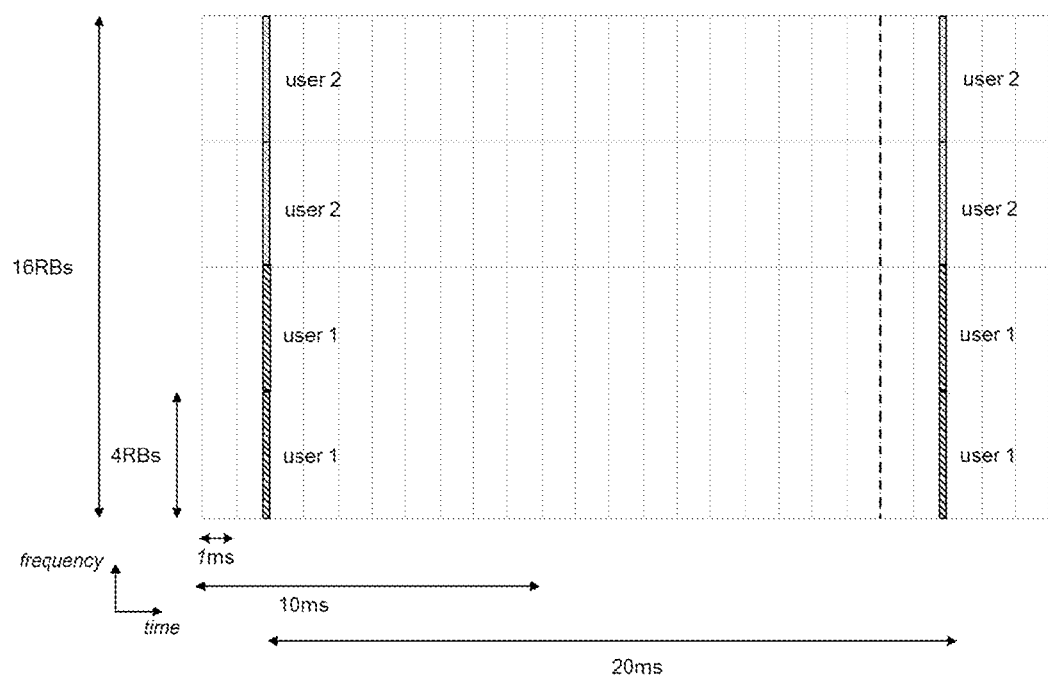
FIG. 14a illustrates a further method for UL non-data transmission using SRS and component subband specific UL power control in LTE-Advanced release 11.
Figure 14B:
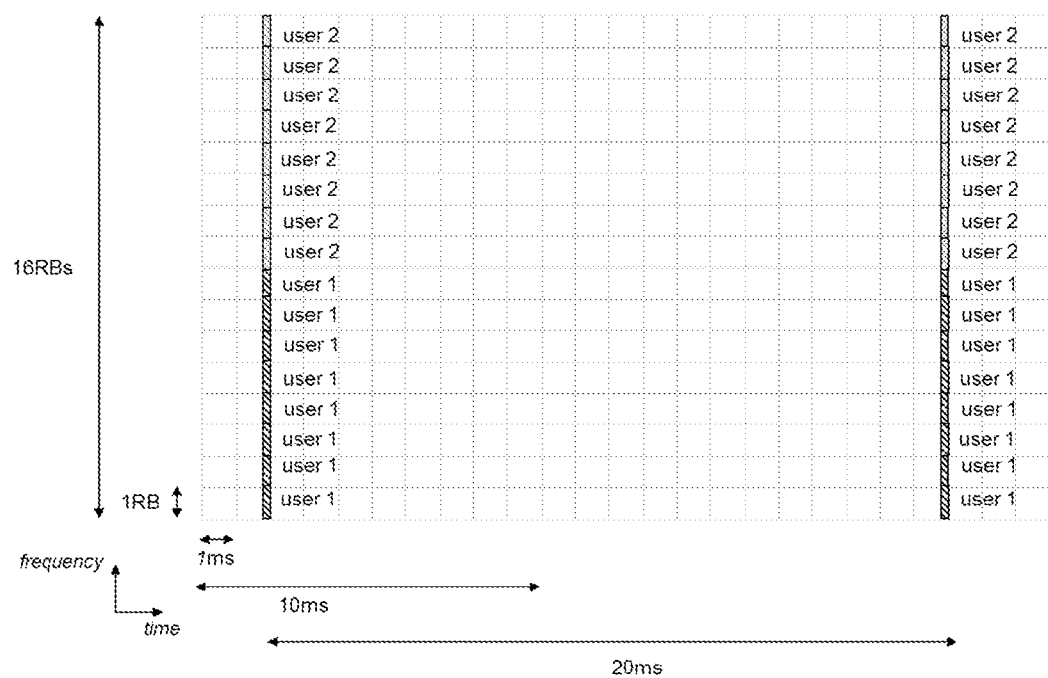
FIG. 14b illustrates another method for UL non-data transmission using a new type of SRS and component subband specific UL power control in LTE-Advanced release 11.

FIG. 14a displays Method C in a time/frequency grid for B=16 RBs and S=4 subbands. FIG. 14b shows Method D in a time/frequency grid for B=16 RBs and S=16 subbands. Assuming that a specific BS has two users (user 1 and user 2) to be scheduled, a possible scheduling of users in the available subbands is shown.

Practical Implementation

Figure 15:
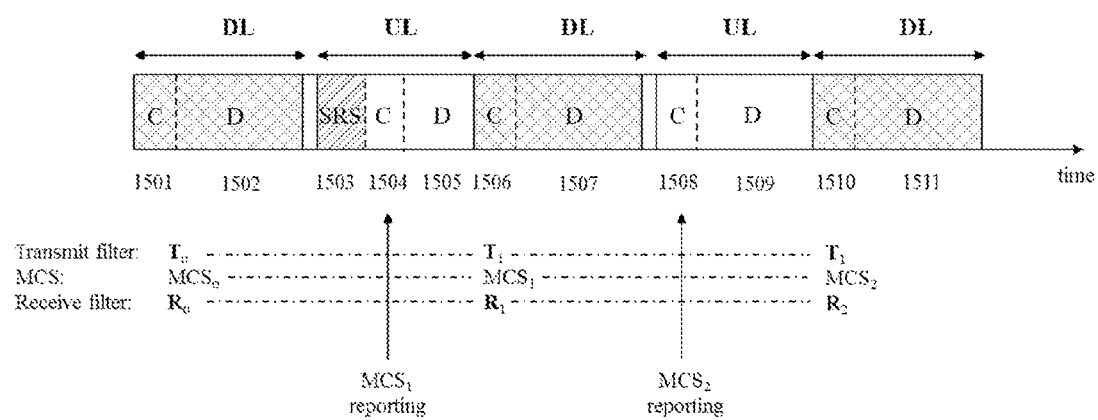
FIG. 15 illustrates a method related to the second embodiment of the invention in a TDD LTE-Advanced release 11 wireless communication system using SRS for UL non-data transmission.

Embodiment 2 of the present invention is the most suitable procedure for implementation in 3GPP LTE-Advanced, as the use of UL non-data transmission to broadcast the interference cost allows not degrading UL data transmission and the presented procedure is able to dynamically include new users appearing and disappearing in the system. In this regard, FIG. 15 provides the detailed steps as applied to a TDD LTE-Advanced wireless communication system.

The transmission is carried out in five slots alternating DL and UL transmissions, each including control-plane and data-plane information transmission.

$1^{st}$ slot (DL):
  Control-plane transmission (1501): DL control-plane information is broadcasted, from which the user updates the receive filter $R_0$;
  Data-plane transmission (1502): DL data transmission is carried out by means of transmit filter $T_0$ at a specific $MCS_0$;

$2^{nd}$ slot (UL):
  Sounding reference signals transmission (1503): BSs acquire knowledge of the interference cost matrix to properly update transmit filters $T_1$ in next DL slot (1506, 1507);
  Control-plane transmission (1504): users communicate to the serving BS the most suitable $MCS_1$ to be applied in the next DL slots (1507, 1511);
  Data-plane transmission (1505): UL data transmission is carried out;

$3^{rd}$ slot (DL):
  Control-plane transmission (1506): update of the DL receive filter $R_1$;
  Data-plane transmission (1507): DL data transmission is carried out with DL transmit filter $T_1$ designed at 1503, and $MCS_1$ reported at 1504;

$4^{th}$ slot (UL):
  Control-plane transmission (1508): $MCS_2$ to be applied in the next DL slot (1510, 1511) is reported;
  Data-plane transmission (1509): UL data transmission is carried out $5^{th}$ slot (DL):
  Control-plane transmission (1510): update of the DL receive filter $R_2$;
  Data-plane transmission (1511): DL data transmission is carried out with DL transmit filter $T_1$ designed at 1503, and $MCS_2$ reported at 1508;

While preferred embodiments of the invention have been shown and described herein, it will be understood that such embodiments are provided by way of example only. Numerous variations, changes and substitutions will occur to those skilled in the art without departing from the spirit of the invention. Accordingly, it is intended that the appended claims cover all such variations as fall within the spirit and scope of the invention.

REFERENCES

[3GPP-SCE] 3GPP R1-130856, Evaluation Assumptions for SCE.
[3GPP-TR36829] 3GPP Technical Report 36.829, "Enhanced performance requirement for LTE User Equipment (UE)", v11.1.0 Release 11, January 2013.
[Christensen-08] S. Christensen, R. Agarwal, E. Carvalho, J. M. Cioffi, "Weighted Sum-Rate Maximization using Weighted MMSE for MIMO-BC Beamforming Design," *IEEE Trans. on Wireless Commun., vol.* 7, no. 12, pp. 4792-4799, December 2008.
[Shi-11] Q. Shi, M. Razaviyayn, Z. Luo, C. He, "An Iteratively Weighted MMSE Approach to Distributed Sum-Utility Maximization for a MIMO Interfering Broadcast Channel", IEEE Trans. on Signal Processing, vol. 59, no. 9, pp. 4331-4340, September 2011.
[Kelly-98] F. P. Kelly, A. K. Maulloo, D. K. H. Tan, "Rate control in communication networks: shadow prices, proportional fairness and stability", *Journal of the Operational Research Society*, vol. 49, April 1998.

What is claimed is:

1. A method for decentralized interference management in a wireless communication system, including interference control at transmitters and interference mitigation at receivers, that takes into account the reciprocity of radio channels in Time Division Duplexing systems (TDD), where the transmitters and receivers are Base Stations (BSs) provided with at least a transmit filter and multiple User Equipment (UEs) provided with a receive filter and a transmit filter, respectively, each BS having knowledge of an estimated version of the channel towards its associated UEs, but not of the neighboring ones associated to other BSs, comprising:
  a) sensing an uplink transmission at each BS from the UEs associated to other BSs;
  b) processing at said BSs said uplink transmission for determining interference information;
  c) adjusting for each BS a transmit filter for a downlink transmission to associated UEs under an optimization transmission criterion and to mitigate interference towards UEs associated to other BSs, said adjustment of the downlink transmit filter at said BS is implemented in the digital signal processing (DSP) block at the BS controller;
  d) said UEs on receipt of said downlink transmission adjusting its receive filter under an optimization reception criterion, and
  e) adjusting for each UE a transmit filter using said receive filter for a further uplink transmission to be sensed by all BSs.

2. The method according to claim 1 further comprising iterations of steps a) to e) to achieve a predetermined level of interference mitigation.

3. The method according to claim 1 wherein at least one among the plurality of BSs and active UEs are equipped with one, two, three, four or more antennas, where said antennas can be collocated or distributed.

4. The method according to claim 1 wherein said adjusting of the downlink transmit filter at said BS is implemented in a digital signal processing (DSP) block at a BS controller.

5. The method according to claim 1 wherein said adjusting of the uplink transmit filter at said UE is implemented in the digital signal processing (DSP) block at the UE.

6. The method according to claim 1 wherein steps a) to e) are performed for at least one carrier frequency in a multi-carrier system.

7. The method according to claim 1 wherein said processing of step b) comprises computing an interference cost matrix which is estimated as a function of the covariance matrix of the received interference-plus-noise signal at each BS from said uplink transmission from UEs associated to other BSs.

8. The method according to claim 1, wherein said optimization of step c) of the downlink transmit filter of said BS to its associated UEs is done by taking into account: i) an estimated version of the channel towards its associated UEs, and ii) the interference cost matrix that reflects the interference created by BS towards UEs associated to other BSs.

9. The method according to claim 1, wherein said optimization of step c) of the downlink transmit filter of said BS to its attached UE is done by taking into account: i) an estimated version of the channel towards its associated UEs, ii) the interference cost matrix that reflects the interference created by BS towards UEs associated to other BSs, and iii) the covariance matrix of the interference-plus-noise at the associated UEs.

10. The method according to claim 1, wherein said downlink from each BS to corresponding UEs served, and said uplink from served UE to its BS do not involve data transmission, so that only spatially filtered sounding symbols are transmitted.

11. The method according to claim 1 wherein said downlink from each BS to corresponding associated UEs includes data transmission, and said uplink from associated UEs to its BS does not involve data transmission.

12. The method according to claim 1 wherein said downlink from each BS to corresponding associated UEs does not include data transmission and said uplink from associated UEs to its BS involves data transmission.

13. The method according to claim 1 wherein both said downlink and said uplink involve data transmission.

14. The method according to claim 1 wherein each UE at step d) estimates the equivalent channel, that includes the combined effect of the propagation channel and the transmit filter, towards its BS and the covariance matrix of the interference-plus-noise, and implements a downlink receive filter.

15. The method according to claim 1 wherein each UE at step e) uses sounding reference signals defined in 3GPP LTE-A release 11 configured for uplink transmission.

16. Method according to claim 1, for decentralized UL interference management wherein the role of BSs is now adopted by UEs, and the role of UEs is adopted by BSs, for optimized UL data transmission.

17. A decentralized DL interference management procedure for a wireless communication system comprising:
several Base Stations (BSs), each provided with one transmit filter per served UE, and
multiple receiving User Equipment (UEs) each provided with a receive filter and a transmit filter, each BS having knowledge of an estimated version of the channel towards its associated UEs, but not of the neighboring ones associated to other BSs, wherein the BS performs the following actions:
sensing uplink transmissions from at least one UE associated with other BSs;
processing by a processor of the BS said uplink transmission for determining interference information; and
adjusting a digital signal processor of a BS controller said transmit filter for a downlink data transmission to said receive filter of said associated UEs under an optimization criterion in order to mitigate interference towards said UEs that are associated with other BSs,
wherein both transmit filter and receiver filter are spatial filters.

18. The method according to claim 17, for decentralized UL interference management wherein the role of BSs is now adopted by UEs, and the role of UEs is adopted by BSs, for optimized UL data transmission.

19. Method for decentralized interference management in a wireless communication system, including interference control at transmitters and interference mitigation at receivers, that takes into account the reciprocity of radio channels in Time Division Duplexing systems (TDD), where the transmitters and receivers are Base Stations (BSs) provided with at least a transmit filter and multiple User Equipment (UEs) provided with a receive filter and a transmit filter, respectively, each BS having knowledge of an estimated version of the channel towards its associated UEs, but not of the neighboring ones associated to other BSs, comprising:
a) sensing an uplink transmission at each BS from the UEs associated to other BSs;
b) processing at said BSs said uplink transmission for determining interference information;
c) adjusting each BS a transmit filter for a downlink transmission to associated UEs under an optimization transmission criterion and to mitigate interference towards UEs associated to other BCs, said adjustment of the downlink transmit filter at said BS is implemented in the digital signal processing (DSP) block at the BS controller;
d) said UEs on receipt of said downlink transmission adjusting its receive filter under an optimization reception criterion, and
e) adjusting each UE a transmit filter using said receive filter for a further uplink transmission to be sensed by all BSs,
wherein both transmit filter and receiver filter are spatial filters.

* * * * *